(12) United States Patent
Wakao et al.

(10) Patent No.: US 7,296,161 B1
(45) Date of Patent: Nov. 13, 2007

(54) IMAGE PROCESSING APPARATUS AND IMAGE PROCESSING METHOD

(75) Inventors: Satoru Wakao, Tokyo (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,424

(22) Filed: Mar. 8, 2000

(30) Foreign Application Priority Data

Mar. 10, 1999 (JP) ................................. 11-063174
Mar. 2, 2000 (JP) ............................. 2000-057077

(51) Int. Cl.
*H04L 9/00* (2006.01)
(52) U.S. Cl. .................................................... 713/176
(58) Field of Classification Search ................ 713/176, 713/165, 167; 382/282, 115; 705/51, 56, 705/58; 726/4, 5
See application file for complete search history.

(56) References Cited

U.S. PATENT DOCUMENTS

| | | | |
|---|---|---|---|
| 5,499,294 A * | 3/1996 | Friedman | 713/179 |
| 5,600,720 A | 2/1997 | Iwamura et al. | |
| 5,666,419 A | 9/1997 | Yamamoto et al. | |
| 5,898,779 A * | 4/1999 | Squilla et al. | 713/176 |
| 5,937,395 A | 8/1999 | Iwamura | |
| 6,209,092 B1 * | 3/2001 | Linnartz | 713/176 |
| 6,611,599 B2 * | 8/2003 | Natarajan | 380/203 |
| 6,647,126 B1 * | 11/2003 | Wen | 713/176 |

OTHER PUBLICATIONS

Schneier, Applied Cryptography 1996, Wiley and Sons, 2$^{nd}$ Edition, pp. 442-443.*

* cited by examiner

*Primary Examiner*—Kambiz Zand
*Assistant Examiner*—Thomas M Ho
(74) *Attorney, Agent, or Firm*—Fitzpatrick, Cella, Harper & Scinto

(57) ABSTRACT

An apparatus generates additional data used to check whether an encoded digital image is changed or not. The apparatus includes a calculation unit and a recording unit. The calculation unit (a) performs a predetermined calculation using the encoded digital image and confidential information and (b) generates the additional data by applying a one-way function to a result of the predetermined calculation. The recording unit records both the encoded digital image and the additional data on a recording medium. The confidential information includes (a) first information unique to the apparatus, and (b) second information unique to an external apparatus connected to the apparatus.

32 Claims, 27 Drawing Sheets

IMAGE PROCESSING APPARATUS AND IMAGE PROCESSING METHOD

BACKGROUND OF THE INVENTION

1. Field of the Invention

The present invention relates to image processing apparatuses and image processing methods, and more particularly, to a technology for protecting the copyright of digital image information.

2. Description of the Related Art

Image input apparatuses, such as digital cameras, for recording images in a recording medium as digital data, rather than in photographic paper or 8-mm film, have recently become commercially available.

In general, digital data can be easily processed, unlike analog data, and therefore can be readily modified, falsified, forged, or synthesized. Consequently, digital data has lower authentication than conventional film (silver halide) photographs and is difficult to be used as a proof.

To solve the foregoing problem, there has been proposed a technology for detecting modification, falsification, forgery, and synthesis of digital data. For example, a system employing a hash function and a public-key encryption method has been proposed.

A conventional system will be described below by referring to FIG. 1. The public-key encryption method uses a private key and a public key different from each other, makes the public key public, and maintains the private key confidential.

The structure and operation of a transmission side (output side) will be described first.

(1) Digital data M is compressed with the use of a hash function H to obtain a constant-length output h.

(2) Data h is processed with the use of a private key Ke to obtain an output s. This output s is called the digital signature data.

(3) An output circuit outputs the digital signature data s and the digital data M as a set.

The structure and operation of a receiving side (detection side) will be described next.

(4) The digital data M and the corresponding digital signature data s are input.

(5) The digital signature data s is processed with the use of the public key Kd corresponding to the private key Ke to obtain an output h".

(6) The digital data M is compressed with the use of the same hash function H as that used in the transmission side to obtain an output h'.

(7) A comparison circuit compares the output h" obtained in (5) with the output h' obtained in (6). When they match, it is determined that the input digital data M is correct data to which illegitimate processing is not applied. If they do not match, it is determined that illegitimate processing has been applied to the input digital data M.

As described above, in the conventional system, modification, falsification, forgery, and synthesis of the digital data M are detected by the use of the digital signature data s, which is generated by the hash function H and the private key Ke.

This system, however, has the following drawbacks.

An encryption circuit and a decryption circuit used in the public-key cryptosystem have complicated circuit structures and are difficult to be made compact. In addition, a vast amount of calculations is required in the circuits and the processing time is long. Since the public-key encryption method needs calculations of powers and remainders, its calculations are more complicated and enormous than those required for the secret-key cryptosystem (an encryption method in which an encryption key is the same as a decryption key) and therefore it is very difficult to increase the processing speed. In other words, in the conventional system, it is difficult to achieve fast processing and to make the system compact.

To increase the processing speed, it is necessary to use a higher-performance central processing unit (CPU) and a larger-capacity memory to improve the performance of hardware. With such a structure, however, the entire system becomes large and its cost increases. A compact, inexpensive, high-speed system cannot be provided for the user.

SUMMARY OF THE INVENTION

Accordingly, an object of the present invention to solve the above-described drawbacks.

Another object of the present invention is to provide a technology which allows the copyright of digital data to be protected with a simple structure at low cost and safety.

As a preferred embodiment for such objects, the present invention discloses an image processing apparatus including calculation means for performing a predetermined calculation with the use of a digital image and confidential information; and generation means for generating signature data with the use of an output of the calculation means in order to detect illegitimate processing applied to the digital image.

As another preferred embodiment for such objects, the present invention discloses an image processing apparatus including input means for inputting a digital image and signature data used for detecting illegitimate processing applied to the digital image; calculation means for performing a predetermined calculation with the use of the digital image and confidential information; and detecting means for detecting illegitimate processing applied to the digital image, with the use of the signature data and a result of the predetermined calculation.

As still another embodiment for such objects, the present invention discloses an image processing method including the steps of performing a predetermined calculation with the use of a digital image and confidential information; and generating signature data with the use of a result of the predetermined calculation in order to detect illegitimate processing applied to the digital image.

As yet another embodiment for such objects, the present invention discloses an image processing method including the steps of inputting a digital image and signature data used for detecting illegitimate processing applied to the digital image; performing a predetermined calculation with the use of the digital image and confidential information; and detecting illegitimate processing applied to the digital image according to the signature data and a result of the predetermined calculation.

As still yet another embodiment for such objects, the present invention discloses an image processing method including the steps of performing a predetermined calculation with the use of a digital image and confidential information; generating signature data with the use of a result of the predetermined calculation in order to detect illegitimate processing applied to the digital image; externally outputting the digital image and the signature data; externally inputting the digital image and the signature data; performing the predetermined calculation with the use of the digital image and the confidential information; and detecting illegitimate processing applied to the digital image, with the use of the signature data and a result of the predetermined calculation.

As a further embodiment for such objects, the present invention discloses an image processing apparatus including calculation means for performing a predetermined calculation with the use of a digital image and confidential information; and generation means for generating signature data with the use of an output of the calculation means in order to determine whether the digital image has been modified.

As a still further embodiment for such objects, the present invention discloses an image processing apparatus including input means for inputting a digital image and signature data used for determining whether the digital image has been modified; calculation means for performing a predetermined calculation with the use of the digital image and confidential information; and detecting means for determining with the use of the signature data and an output of the calculation means whether the digital image has been modified.

As a yet further embodiment for such objects, the present invention discloses an image processing method including the steps of performing a predetermined calculation with the use of a digital image and confidential information; and generating signature data with the use of a result of the predetermined calculation in order to determine whether the digital image has been modified.

As a still yet further embodiment for such objects, the present invention discloses an image processing method including the steps of inputting a digital image and signature data used for determining whether the digital image has been modified; performing a predetermined calculation with the use of the digital image and confidential information; and determining according to the signature data and a result of the predetermined calculation whether the digital image has been modified.

As a still more further embodiment for such objects, the present invention discloses an image processing method including the steps of performing a predetermined calculation with the use of a digital image and confidential information; generating signature data with the use of a result of the predetermined calculation in order to determine whether the digital image has been modified; externally outputting the digital image and the signature data; externally inputting the digital image and the signature data; performing the predetermined calculation with the use of the digital image and the confidential information; and determining with the use of the signature data and a result of the predetermined calculation whether the digital image has been modified.

Still other objects of the present invention and advantages thereof will become fully apparent from the following detailed description of embodiments.

DESCRIPTION OF THE PREFERRED EMBODIMENTS

Preferred embodiments of the present invention will be described below in detail by referring to the accompanying drawings.

(Basic Structure)

The basic structure and processing procedure of a digital image verification system common to all embodiments will be described below by referring to FIG. 2. This system is formed of a digital image input apparatus 10 for generating digital signature data from digital image data, and an image verification apparatus 20 for detecting, with the use of the digital signature data, illegitimate processing applied to the digital image data. The apparatuses are connected through a network, such as the Internet, a telephone line network, or a mobile communication network; an identical digital interface of each apparatus; and/or a removable storage medium, such as an optical disk, a magnetic disk, a magneto-optical disk, and a semiconductor memory.

Figure 1:
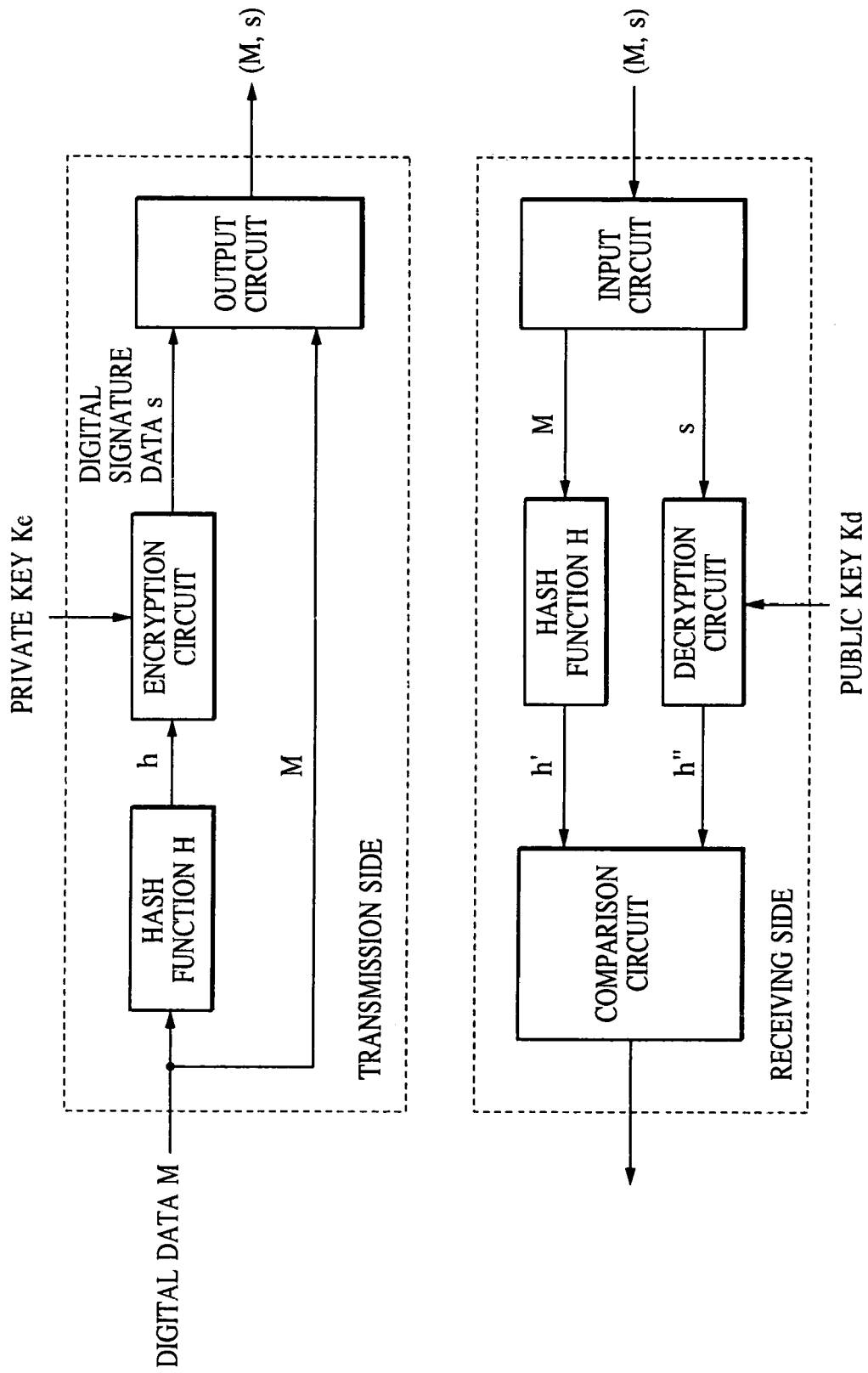
FIG. 1 is a block diagram of a conventional system.
Figure 2:
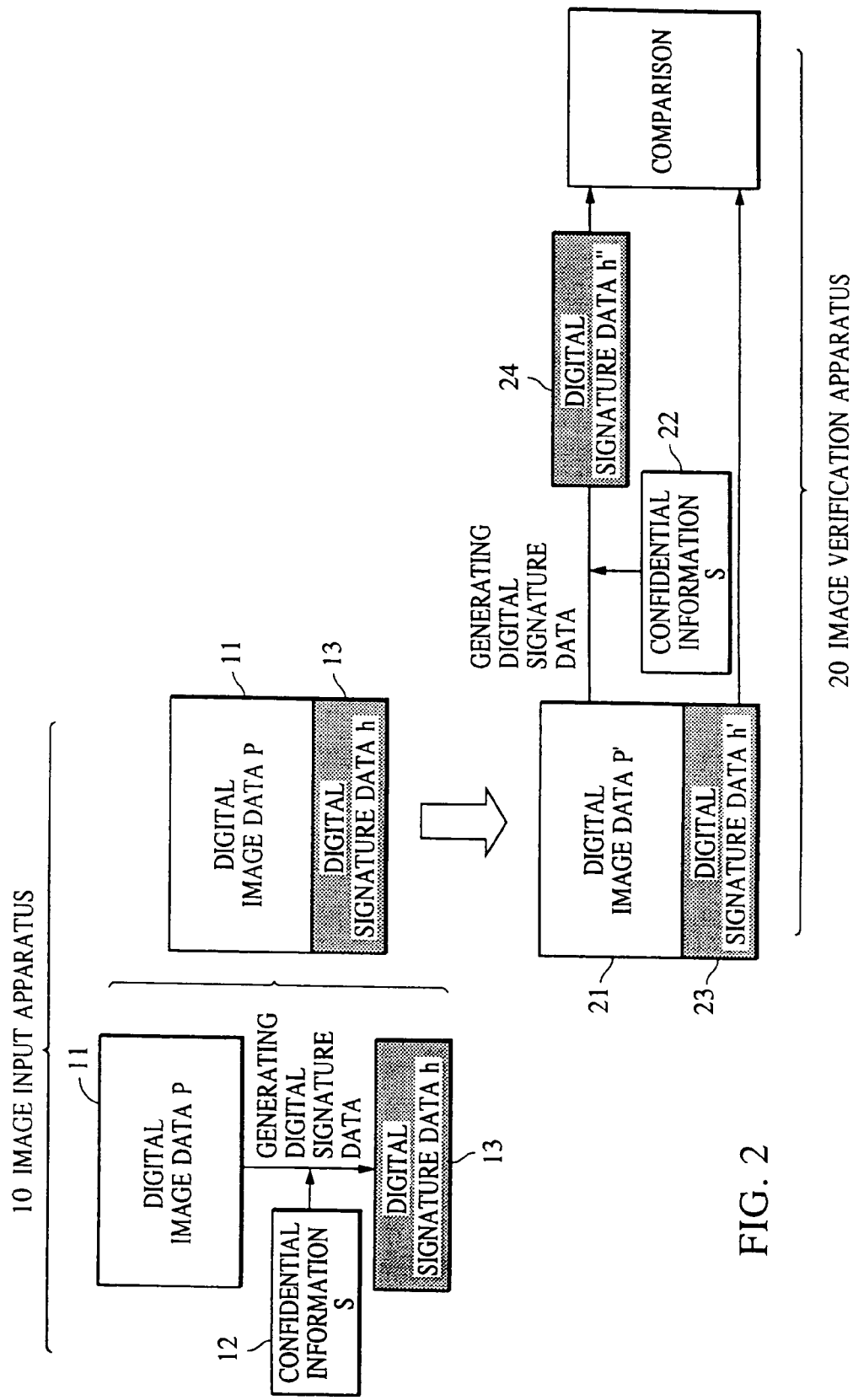
FIG. 2 is a view showing a digital image verification system according to the present invention.

In FIG. 2, the image input apparatus 10 and the image verification apparatus 20 share identical confidential information S 12, 22. The confidential information S 12, 22 is recorded into a read-only recording medium, and controlled so as to be kept confidential.

The image input apparatus 10 generates digital signature data h 13 from digital image data P 11 and the confidential information S 12. More specifically, the image input apparatus 10 applies a predetermined operation, such as addition, multiplication, or synthesis, to the digital image data P 11 with the use of the confidential information S 12, applies a one-way function, for which it is difficult or impossible to generate an inverted function, such as a hash function, to the operation result, and generates the digital signature data h 13 from the function result. The digital signature data h 13 is temporarily recorded together with the corresponding digital image data P 11, and output to the outside, if necessary.

The digital signature data h 13, obtained by such processing, is information unique to the digital image data P 11 and the confidential information S 12. Therefore, without knowing the confidential information S 12 and the predetermined operation, the digital signature data h 13 corresponding to the digital image data P 11 cannot be produced illegitimately. Therefore, the integrity of the digital image data P 11 can be verified according to the digital signature data h 13 in a safe condition. In addition, due to the nature of the one-way function, the original data, that is, the digital image data P 11 to which the predetermined operation has been applied with the use of the confidential data S 12, cannot be obtained from the digital signature data h 13. Therefore, the integrity of the digital image data P 11 can be verified according to the digital signature data h 13 in a safe condition.

The image verification apparatus 20 receives digital signature data h' 23 together with digital image data P' 21 from the outside. The image verification apparatus 20 performs the same processing as the image input apparatus 10 with the use of the digital image data P' 21 and confidential information S 22 (the same as the confidential information S12) to generate digital signature data h" 24.

The digital signature data h" 24 is compared with the digital signature data h' 23, which has been received together with the digital image data P' 21. When they match, the image verification apparatus 20 determines that the digital image data P' 21 is data that has integrity. They do not match if illegitimate processing has been applied to the digital image data P' 21 before it is received. In this case, the image verification apparatus 20 determines that the digital image data P' 21 is illegitimately processed data.

With this procedure, the image verification apparatus 20 determines whether illegitimate processing, such as modification, falsification, forgery, or synthesis, has been applied to the digital image data P' 21 received from the outside.

As described above, according to the present invention, digital signature data is generated at a high speed with a small amount of calculations in a simple, inexpensive circuit structure, without using a complicated encryption technology, such as a public-key encryption method. The copyright of digital image data is protected by the use of digital signature data. Illegitimate processing, such as modification, falsification, forgery, or synthesis, applied to digital image data is positively detected.

The basic structures of the image input apparatus 10 and the image verification apparatus 20 will be described next in detail.

(1) Structure of the Image Input Apparatus

Figure 3:
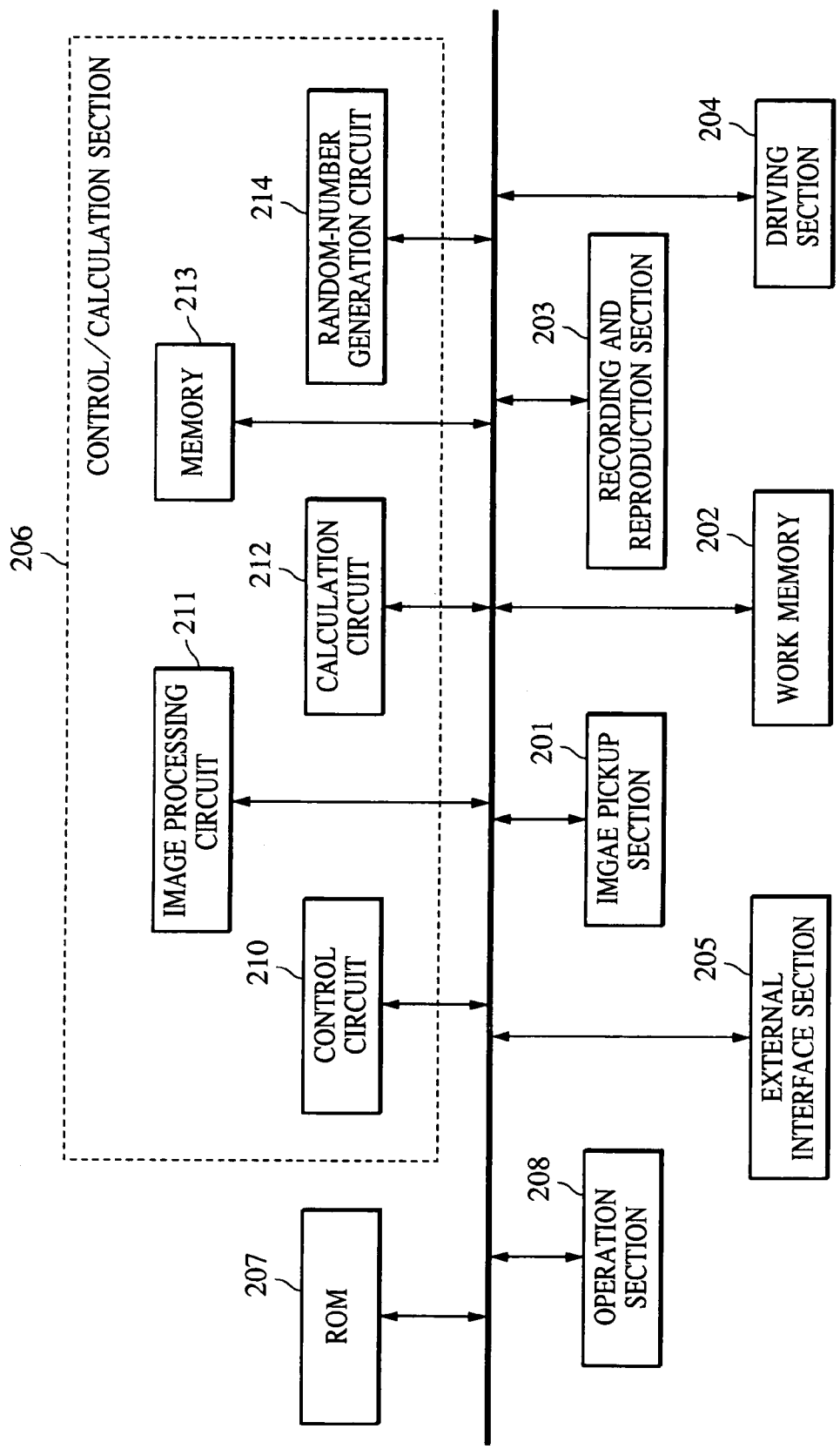
FIG. 3 is a block diagram showing a basic structure of an image input apparatus according to the present invention.

FIG. 3 is a block diagram of the input image apparatus 10. The image input apparatus 10 is an electronic unit having an image pickup function, such as a digital camera, a digital camcorder, or a scanner.

In FIG. 3, an image pickup section 201 includes a charge coupled device (CCD) and a lens. It converts an optical image of an object to an electric signal, and further converts the electric signal to digital image data having a predetermined format. A work memory 202 temporarily stores the digital image data, and is used for highly efficient encoding processing for the digital image data and for generating digital signature data, described later.

A recording and reproduction section 203 records the digital image data generated by the image pickup section 201 and encoded highly efficiently, and the corresponding digital signature data into a removable recording medium, such as an optical disk, a magnetic disk, a magneto-optical disk, or a semiconductor memory, as a set. A driving section 204 controls the mechanical operations of the image pickup section 201 and the recording and reproduction section 203.

An external interface section 205 is a digital interface which can connect to a network, such as the Internet, a telephone line network, or a mobile communication network. It sends the digital image data to which the digital signature data is added to a predetermined external apparatus.

A control/calculation section 206 includes a control circuit 210 for controlling the operation of the entire image input apparatus 10 according to various programs stored in a ROM 207, an image processing circuit 211 for applying highly efficient encoding (for example, variable-length encoding by quantizing digital image data DCT transformed or wavelet transformed) to the digital image data, a calculation circuit 212 for performing various types of calculation processing such as a hash-function calculation required to generate digital signature data, described later, a memory 213 for storing confidential information (for example, ID information for identifying the image input apparatus 10) required for generating the digital signature data, and a random-number generation circuit 214 for generating random numbers necessary for the calculation circuit 212.

The ROM 207 is a read-only memory and stores programs, such as a program for controlling the operation of the entire image input apparatus 10, a program for controlling image processing, and a program for controlling the generation processing of digital signature data. An operation section 208 receives various instructions from the user and sends control signals corresponding to the instructions to the control/calculation section 206.

(2) Structure of the Image Verification Apparatus

Figure 4:
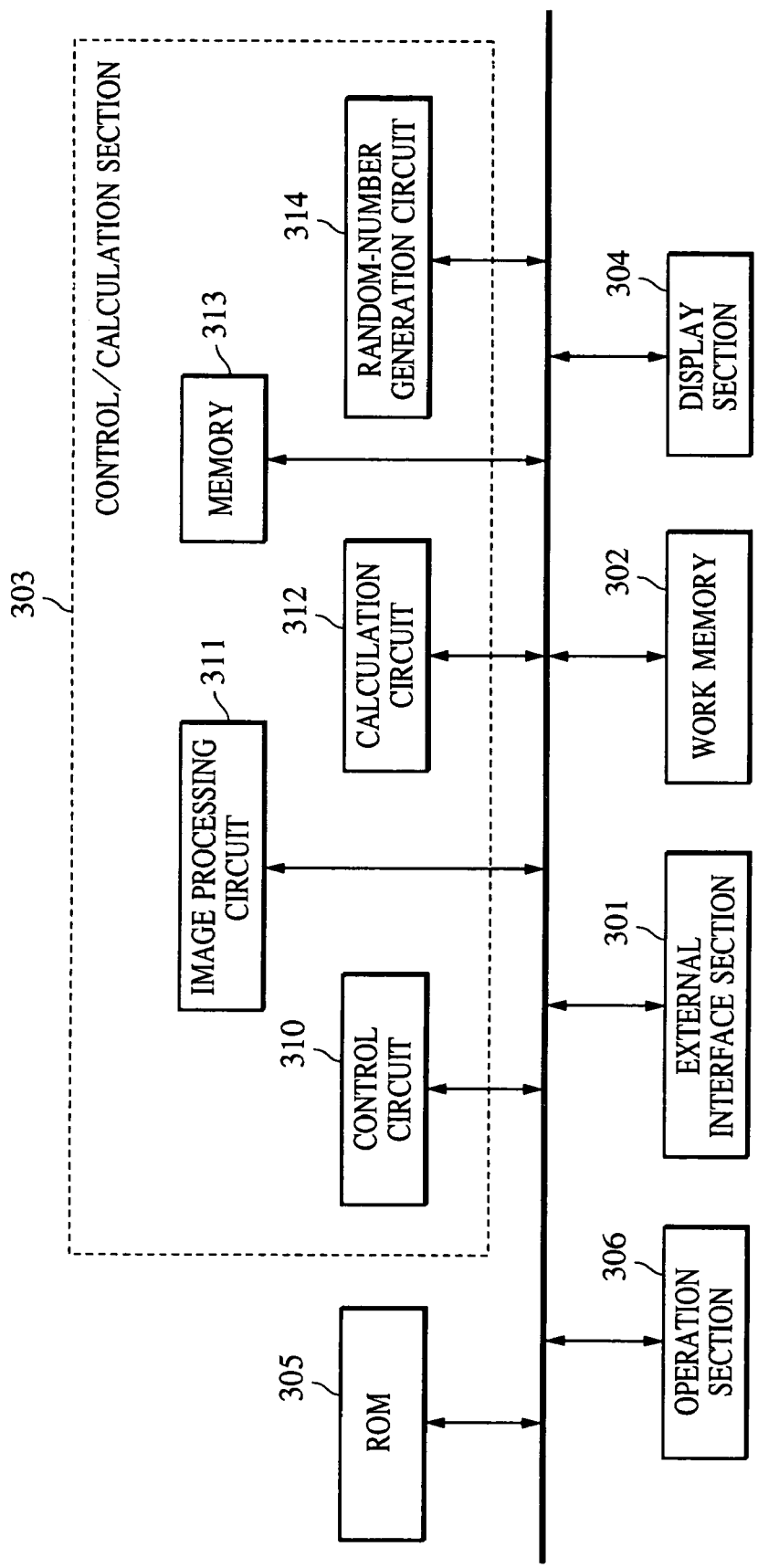
FIG. 4 is a block diagram showing a basic structure of an image verification apparatus according to the present invention.

FIG. 4 is a block diagram of the image verification apparatus 20. The image verification apparatus 20 is an image processing apparatus, such as a personal computer or a workstation, or an extension board which can be connected thereto.

In FIG. 4, an external interface section 301 is a digital interface through which digital image data (which has been highly efficiently encoded) to which digital signature data is added is input from a network. The external interface section 301 can be connected to a removable recording medium. When connected, digital image data recorded in the recording medium is input together with digital signature data through the external interface section 301.

A work memory 302 temporarily stores digital image data, and is used for decompression decoding processing of digital image data and for generating digital signature data, described later.

A control/calculation section 303 includes a control circuit 310 for controlling the operation of the entire image verification apparatus 20 according to various programs stored in a ROM 305, an image processing circuit 311 for applying decompression decoding (for example, applying variable-length decoding, dequantization, and then inverted DCT transform or inverted wavelet transform) to digital image data, a calculation circuit 312 for performing a hash-function calculation required to generate digital signature data, described later, and for performing calculation processing for verifying the digital image data, a memory 313 for storing confidential information required to generate the digital signature data, and a random-number generation circuit 314 for generating random numbers required for the calculation circuit 312.

A display section 304 visually displays the digital image data. Alternatively, the display section 304 visually displays a verification result of the digital image data to the user. The display section 304 is removable from the image verification apparatus 20.

The ROM 305 is a read-only memory and stores programs, such as a program for controlling the operation of the entire image verification apparatus 20, a program for controlling image processing, and a program for controlling the verification processing of digital image data. An operation section 306 receives various instructions from the user and sends control signals corresponding to the instructions to the control/calculation section 303.

In first to sixth embodiments described below, procedures for generating digital signature data according to digital image data and confidential information in the image input apparatus 10 shown in FIG. 3 will be described in detail.

In seventh to twelfth embodiments described below, procedures for verifying the integrity of digital image data in the image verification apparatus 20 shown in FIG. 4 according to digital signature data generated by the image input apparatus 10 will be described in detail.

First Embodiment

In a first embodiment, a procedure by which the image input apparatus 10 generates digital signature data h with the use of confidential information S unique to the apparatus and a hash function will be described. More specifically, a predetermined calculation is performed with the use of digital image data P and the confidential information S, a hash function is applied to the result of the predetermined calculation, and the result of this calculation serves as the digital signature data h corresponding to the digital image data P.

Figure 5:
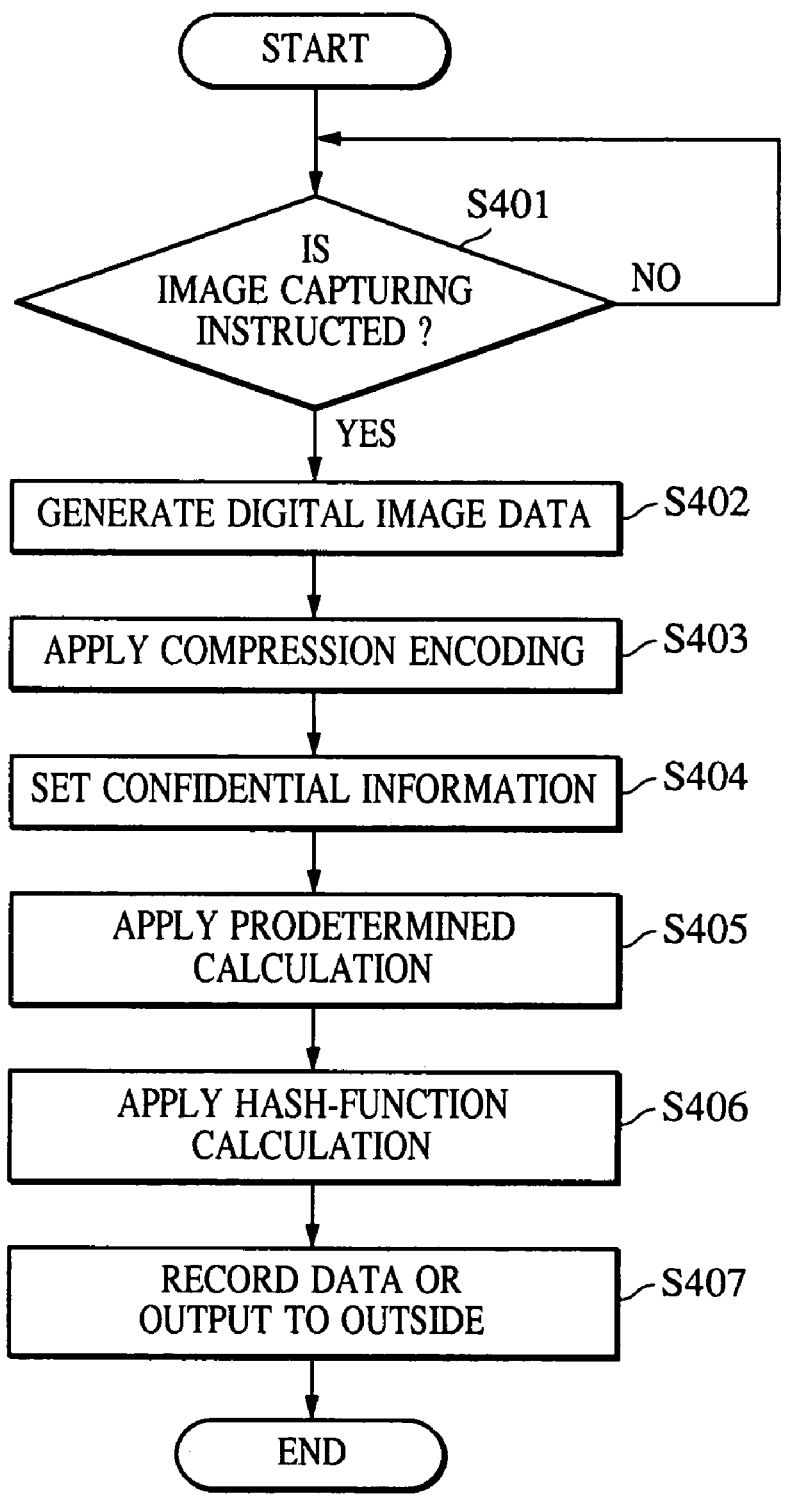
FIG. 5 is a flowchart of a processing procedure according to a first embodiment.

FIG. 5 is a flowchart showing a processing procedure according to the first embodiment. A procedure for generating the digital signature data h will be described below by referring to FIG. 5.

In a step S401, the operation section 208 instructs that an optical image of an object be captured, or does not instruct anything. When image capturing is instructed, the control/calculation section 206 executes a step S402.

In the step S402, the image pickup section 201 converts an optical image of the object to an electric signal and further converts the electric signal to generate digital image data P having a predetermined format. The digital image data P is then stored in the working memory 202.

In a step S403, the control/calculation section 206 (actually, the image processing circuit 211 included therein) applies highly efficient encoding to the digital image data P stored in the working memory 202 in units of screens of still pictures. To highly efficiently encode a still picture, a DCT transform method (specifically, DCT transform, quantization, and variable-length encoding are applied in units of blocks formed of a plurality of pixels), a wavelet transform method (specifically, wavelet transform, quantization, and variable-length encoding are applied in units of blocks formed of a plurality of pixels), a JPEG method, a JBIG method, an MH method, an MMR method, or an MPEG method may be used. In the present and following embodiments, the JPEG method is used for highly efficient encoding.

In a step S404, the control/calculation section 206 reads the confidential information S, which is in the image input apparatus 10, from the memory 213.

In a step S405, the control/calculation section 206 (actually, the calculation circuit 212 included therein) performs the predetermined calculation based on a rule specified in advance, with the use of the confidential information S and the digital image data P (hereinafter called JPEG data) highly efficiently encoded by the JPEG method.

The confidential information S and the predetermined calculation will be described below.

The confidential information S is information specified when the image input apparatus 10 is manufactured and is unique thereto, and is not made public. The confidential information S is placed inside the control/calculation section 206 so as not to be easily accessible from the outside. In the first embodiment, it is assumed that the confidential information S is set to "11111111."

Figure 6:
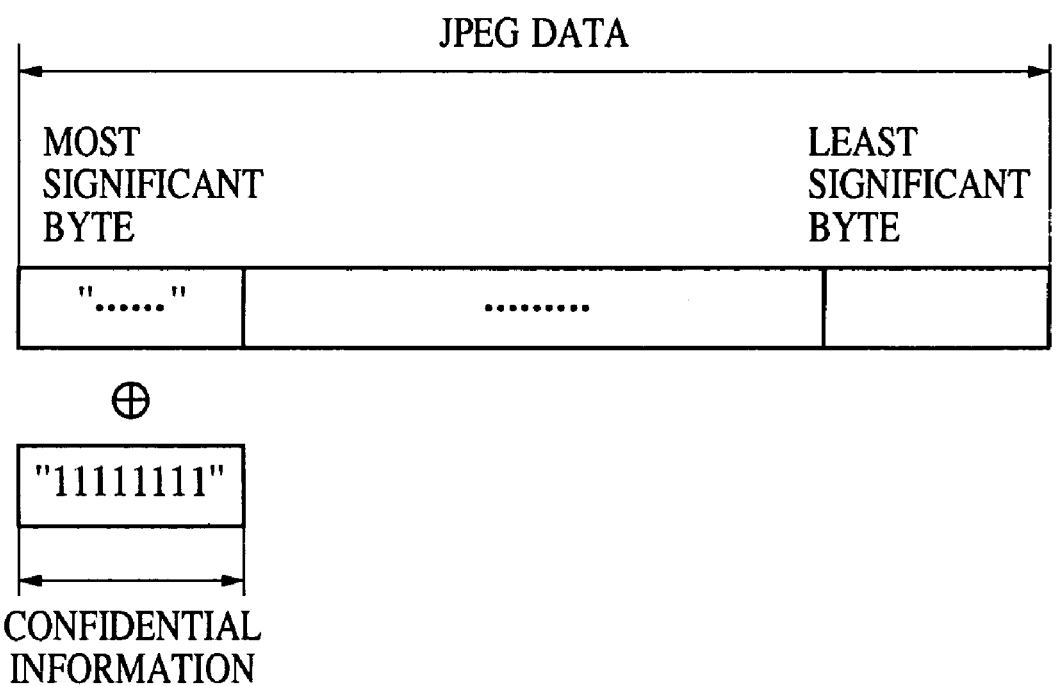
FIG. 6 is a view showing a predetermined calculation according to the first embodiment.

The predetermined calculation will be described below by referring to FIG. 6. In the predetermined calculation, byte data is selected at a predetermined position in a JPEG data string, and exclusive-OR is applied to the byte data and the confidential information S in units of bits to convert the byte data to other data. The predetermined position can be set to any position in the JPEG data string. In the first embodiment, it is set to the most significant byte.

In a step S406, the control/calculation section 206 (actually, the calculation circuit 212 included therein) applies a hash function to the JPEG data to which the predetermined calculation has been applied, to generate digital signature data h.

The hash function will be described below.

The hash function H generates an output h having a constant bit length from digital data M having a variable bit length. The output h is called a hash value (also called a digital signature, a message digest, or a digital fingerprint). In general, the hash function is required to be a one-way function and immune to collision. To be a one-way function means that, when a hash value h is given, it is difficult, in terms of the amount of calculations required, to calculate digital data M which satisfies h=H(M). Immunity to collision means that, when digital data M is given, it is difficult, in terms of the amount of calculations required, to calculate digital data M' (M≠M') which satisfies H(M)=H(M') and it is also difficult, in terms of the amount of calculations required, to calculate digital data M and M' which satisfies H(M)=H(M') and M≠M'. MD-2, MD-4, MD-5, SHA-1, RIPEMD-128, and RIPEMD-160 are known as Hash functions. In the first embodiment, the MD-5 method is used. Digital signature data generated by the MD-5 method has a bit length of 128.

In a step S407, the recording and reproduction section 203 records the digital signature data generated by the control/calculation section 206 and the corresponding digital image data into a removable recording medium or outputs them to an apparatus through the network.

A program for controlling the processing procedure shown in FIG. 5 is stored in the ROM 207. This program is read by the control/calculation section 206 (actually, the control circuit 210 included therein) and activated every time the user instructs image capturing. Therefore, every time a digital image P is captured, the corresponding digital signature data h is generated.

As described above, in the first embodiment, the predetermined calculation is performed with the use of the highly efficiently encoded digital image data P and the confidential information S unique to the image input apparatus 10, the hash function is applied to the result of the predetermined calculation to generate the digital signature data h. With this structure, highly reliable, highly safe digital signature data h is obtained with a structure much simpler than that of the conventional system. In addition, a more inexpensive structure than in the conventional system can be implemented, and higher-speed processing than in the conventional system can also be achieved.

As a result, without obtaining the confidential information S and the predetermined calculation, the digital signature data h corresponding to the digital image data P cannot be generated illegitimately. Therefore, the integrity of the digital image data P is safely verified according to the digital signature data h. In addition, due to the nature of the one-way function, since the original data, that is, the digital image data P to which the predetermined calculation is applied with the use of the confidential data S, cannot be obtained from the digital signature data h, the integrity of the digital image data P is verified from the digital signature data h in a safe condition.

In the first embodiment, the confidential information S is specified when the image input apparatus 10 is manufactured. The present invention is not limited to this case. The confidential information S may be shared with the image verification apparatus 20. Alternatively, the confidential information S may be a bit string generated by the random-number generation circuit 214 according to a predetermined algorithm.

In the first embodiment, exclusive-OR calculation of the confidential information and the byte data of the JPEG data is described as an example of the predetermined calculation. The present invention is not limited to this case. The predetermined calculation may be any calculation in which the confidential information S is added to, combined with, or multiplexed with a part of the highly-efficiently encoded digital image data and for which an inverted calculation is allowed.

In the first embodiment, the digital image data P and the digital signature data h are generated with the same timing. The present invention is not limited to this case. When the digital signature data h is always generated before the digital image data P is output from the image input apparatus 10 to the outside, the digital signature data h may be generated with any timing. When the digital image data P is output to the outside through the external interface section 205, for example, the digital signature data h may be generated after the digital image data P is temporarily stored in a recording medium and before the digital image data P is output to the outside. When the digital image data P is stored in a removable recording medium, the digital signature data h is generated by the above-described procedure.

Second Embodiment

In a second embodiment, a procedure for generating safer digital signature data h than in the first embodiment will be described in detail.

Figure 7:
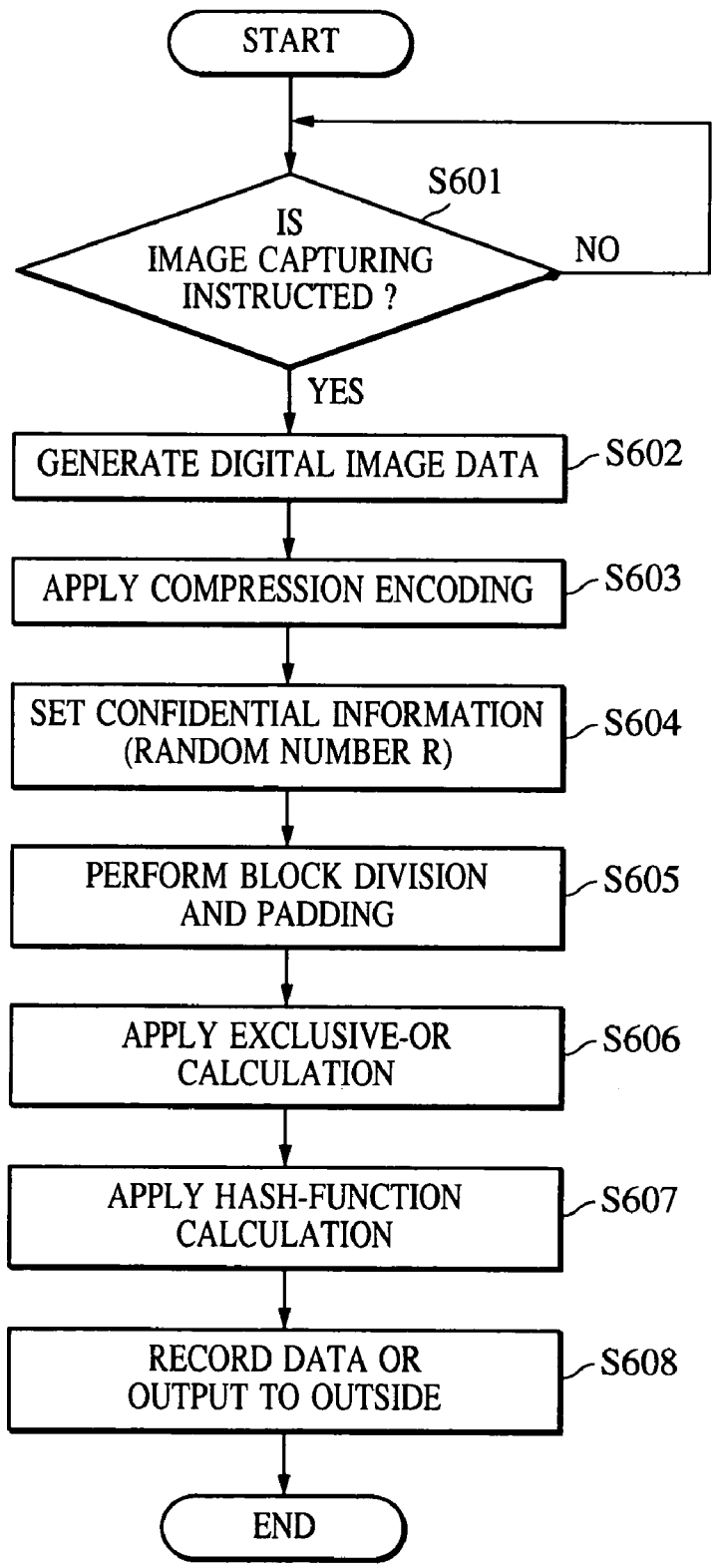
FIG. 7 is a flowchart of a processing procedure according to a second embodiment.

FIG. 7 is a flowchart showing a processing procedure in the second embodiment. The procedure for generating digital signature data h will be described below by referring to FIG. 7.

Since processes in steps S601 to S603 are the same as those in steps the S401 to S403 in the first embodiment, a description thereof will be omitted.

In a step S604, the control/calculation section 206 (actually, the random-number generation circuit 214 included therein) generates a random number R having a bit length of m according to predetermined information (for example, the amount of highly-efficiently-encoded digital image data P). This random number R serves as confidential information S in the second embodiment.

In steps S605 to S606, a predetermined calculation is performed in the second embodiment.

Figure 8:
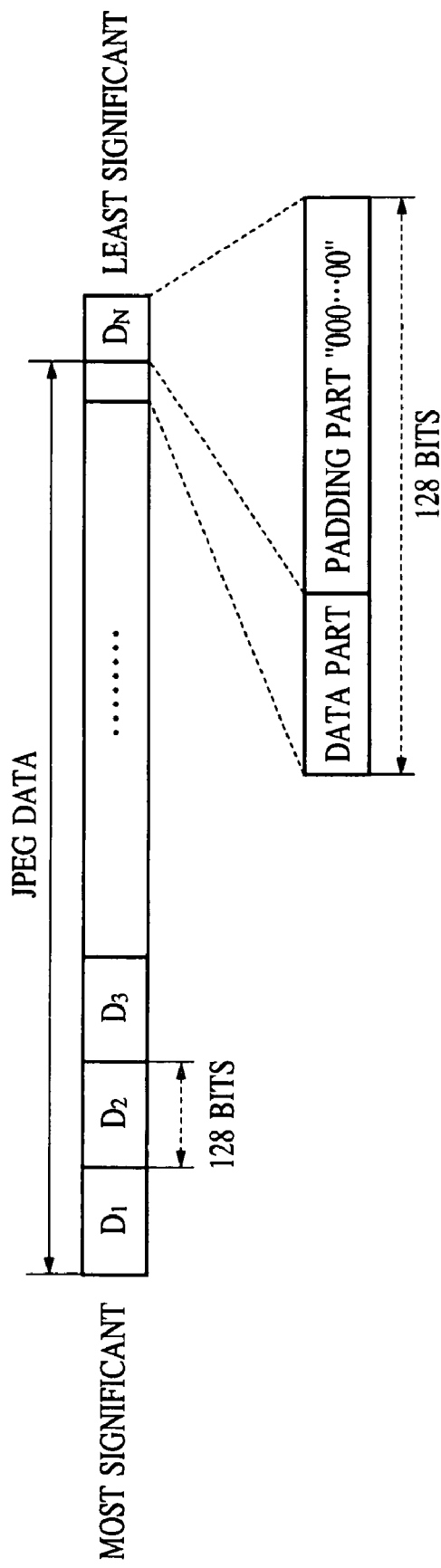
FIG. 8 is a view showing JPEG data according to the second embodiment.

Specifically, in the step S605, the control/calculation section 206 (actually, the calculation circuit 212 included therein) divides JPEG data of one image into blocks Di (i=1, 2, 3, . . . , n) each having a predetermined size (for example, a bit length of 128), as shown in FIG. 8. It is assumed that D1 is the most significant block. When the total amount of the JPEG data is not a multiple of 128 bits, data is padded for the JPEG data so that it has a bit length of a multiple of 128. As shown in FIG. 8, for example, "000 . . . 000" is added to the last block.

In the step S606, the control/calculation section 206 (actually, the calculation circuit 212 included therein) performs calculation by a procedure described below with the use of the random number R and the n blocks.

Figure 9:
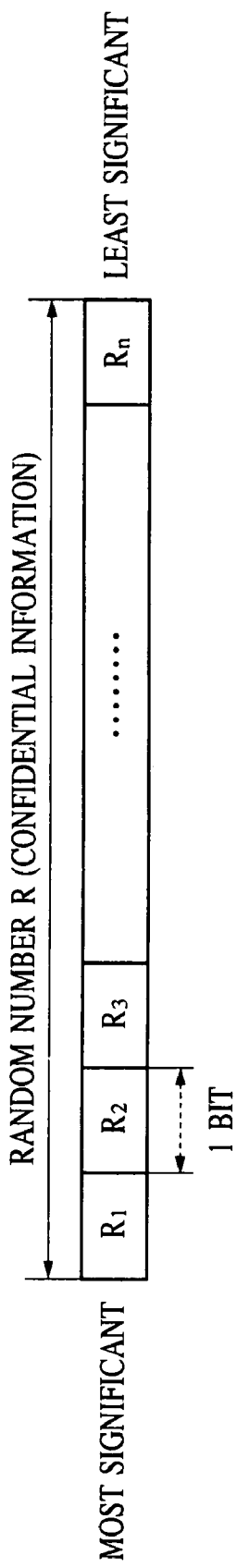
FIG. 9 is a view showing confidential information according to the second embodiment.

The control/calculation section 206 sets the number of bits in the random number to n (the same as the number of blocks Di shown in FIG. 7), as shown in FIG. 9. When n is not larger than m, for example, a bit string from the most significant bit to the n-th bit is set effective and the other bits are discarded. When n is larger than m, "111 . . . 111" is added as data for padding the random number R.

Figure 10:
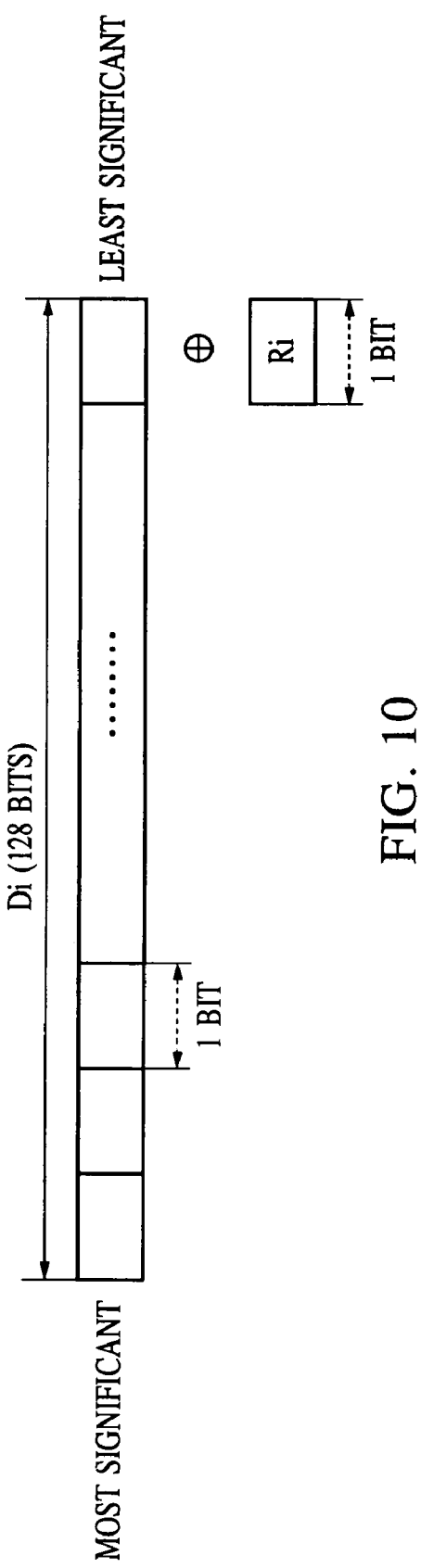
FIG. 10 is a view showing a predetermined calculation according to the second embodiment.

The control/calculation section 206 performs a predetermined calculation with the use of each of the blocks D1 to Dn and each bit of the random number R, R1 to Rn, as shown in FIG. 10. Specifically, exclusive-OR calculation is applied to the bit Ri of the random number R and the least significant bit of the block Di, and this calculation is repeated for i=1 to n.

The calculation in the step S606 is, as described above, exclusive-OR between the bit Ri of the random number R and the least significant bit of the block Di. The present invention is not limited to this case. The calculation can be any calculation in which confidential information (a part of the random number R having a bit length of m) is added to, combined with, or multiplexed with a part of each block Di and for which an inverted calculation is allowed.

In a step S607, the control/calculation section 206 (actually, the calculation circuit 212 included therein) applies a hash function to the output of the step S606 to generate digital signature data h. In the second embodiment, the MD-5 hash function is used in the same way as in the first embodiment. Therefore, the bit length of the digital signature data h is 128.

An example of the calculation processing executed in the step S607 will be described in detail.

The control/calculation section 206 selects one or a plurality of blocks among the output of the step S606. Then, the control/calculation section 206 applies a hash function to the selected block(s) to generate digital signature data h.

Another example of the calculation processing executed in the steps S605 to S607 will be described below in detail by referring to FIGS. 11 to 13.

The control/calculation section 206 selects any one of three operation modes, described later, or combines them to obtain a hash value. Especially in the first mode and the third mode, since the hash value is obtained while a calculation result for a block (having K bits) affects a calculation result for another block, safer digital signature data h is generated. In addition, since a calculation result for the current block affects a calculation result for the next block, the integrity of data can be checked in each block.

(1) First Operation Mode

A first operation mode will be described below by referring to FIG. 11. FIG. 11 is a block diagram of a part of the control/calculation section 206.

Figure 11:
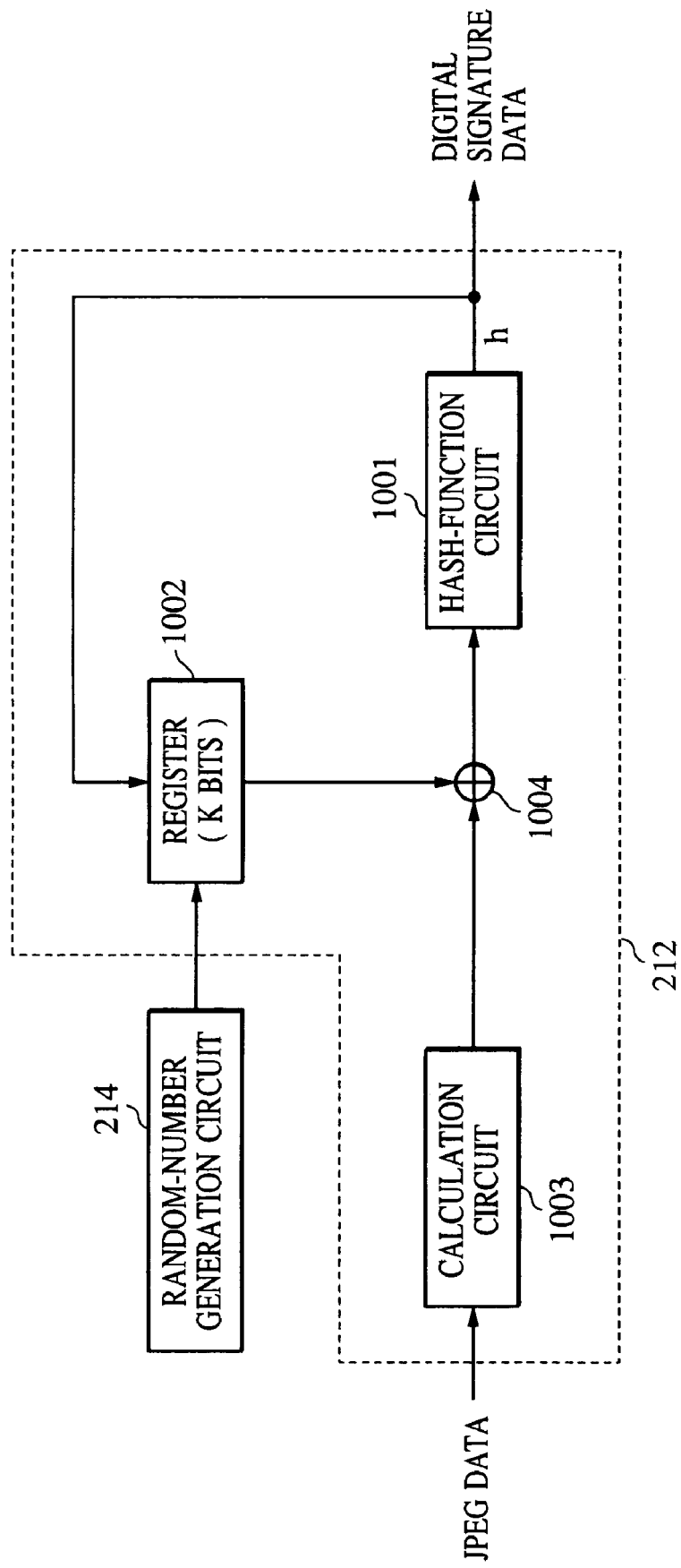
FIG. 11 is a view showing a first operation mode of a hash-function calculation according to the second embodiment.

In FIG. 11, the calculation circuit 212 is formed of a hash-function circuit 1001 for performing a hash-function calculation in units of predetermined bits, a register 1002 for storing a part of the output h (K bits) of the hash-function circuit 1001, a calculation circuit 1003 for dividing the JPEG data into blocks each having K bits, and a calculation circuit 1004 for applying exclusive-OR calculation to the output of the calculation circuit 1003 and the output of the register 1002.

A part of the 128-bit hash value h (K bits), which is the output of the hash-function circuit 1001, is input to the register 1002. The register 1002 temporarily stores, for example, the higher 64 bits of the hash value h.

The K bits stored in the register 1002 are exclusive ORed with one block of the JPEG data, and the calculation result is sent to the hash-function circuit 1001.

The above operation is repeated until a predetermined block is reached. The hash value obtained from the predetermined block is output as digital signature data.

Figure 14:
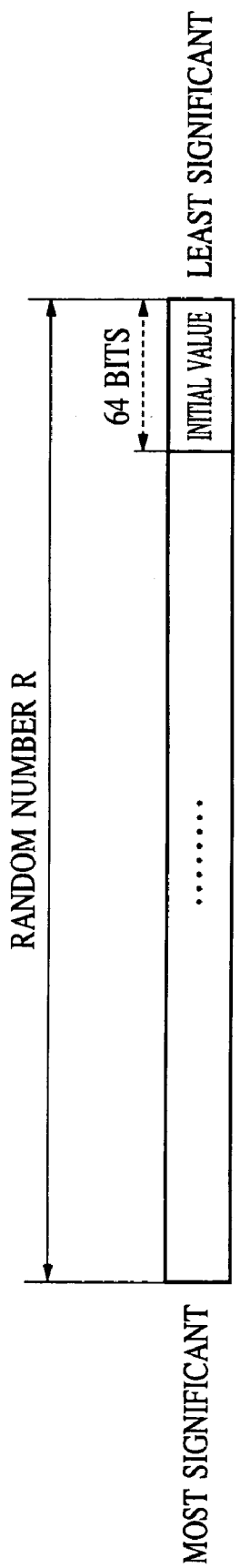
FIG. 14 is a view of an initial value used in the first to third operation modes.

In the first calculation, an initial value needs to be stored in the register 1002. The lower 64 bits of the random number R, for example, can be used as an initial value, as shown in FIG. 14.

If the size of a block Di is not a multiple of K bits, the remaining bit string may be calculated, for example, in a combination of the first operation mode and a third operation mode, described later.

(2) Second Operation Mode

A second operation mode will be described below by referring to FIG. 12. FIG. 12 is a block diagram of a part of the control/calculation section 206.

Figure 12:
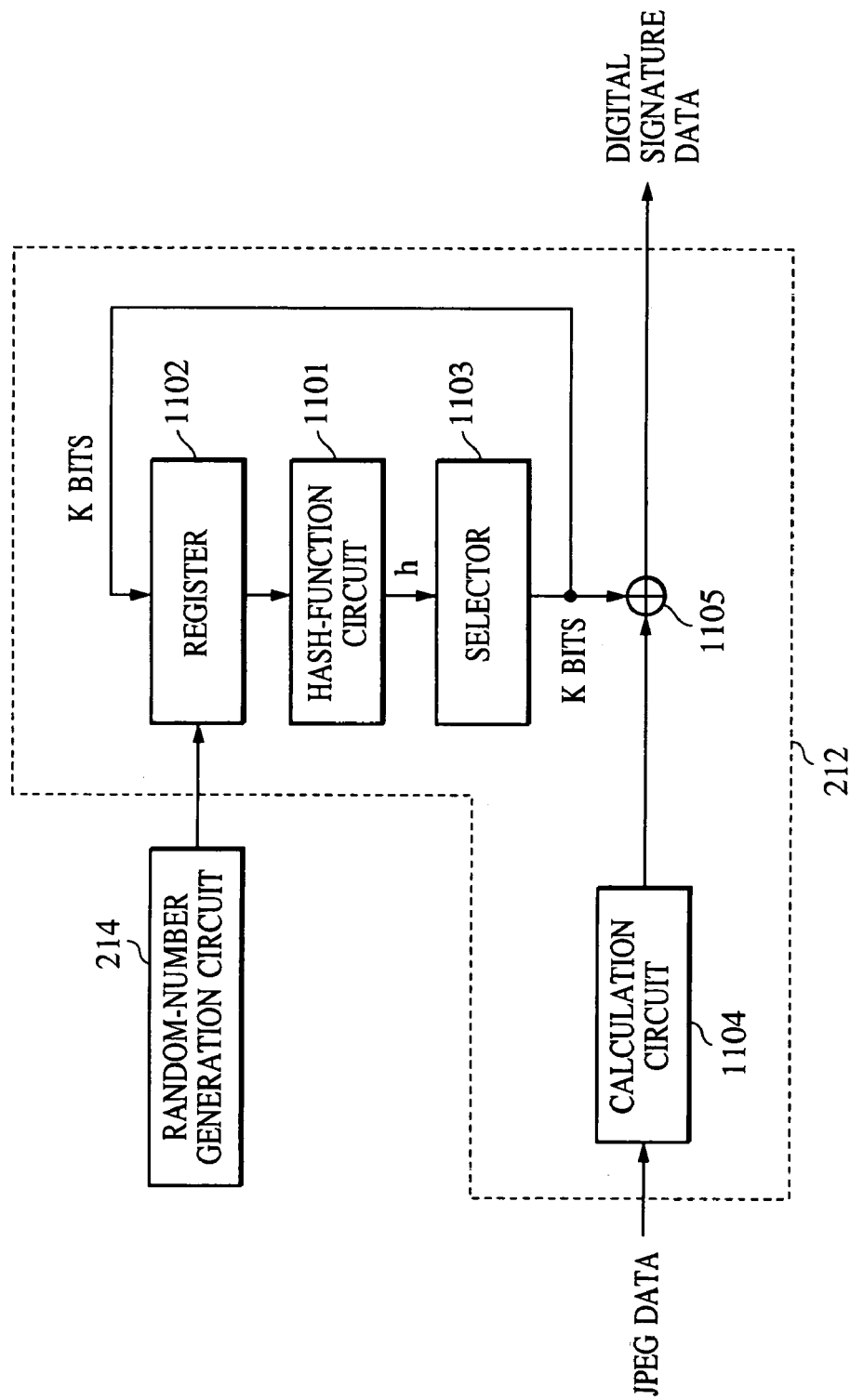
FIG. 12 is a view showing a second operation mode of the hash-function calculation according to the second embodiment.

In FIG. 12, the calculation circuit 212 is formed of a hash-function circuit 1101 for performing a hash-function calculation in units of predetermined bits, a register 1102 for sending a required input value to the hash-function circuit 1101, a selector 1103 for outputting a part of the output h (K bits) of the hash-function circuit 1101, a calculation circuit 1104 for dividing the JPEG data into blocks each having K bits, and a calculation circuit 1105 for applying an exclusive-OR calculation to the output of the selector 1103 and the output of the calculation circuit 1104.

The hash-function circuit 1101 applies a hash function to the value held by the register 1102, which has the confidential information (that is, the random number R) generated by the random-number generation circuit 214 as an initial value.

A 128-bit hash value h, which is the output of the hash-function circuit 1101, is input to the selector 1103. The selector 1103 outputs, for example, the lower K bits of the 128-bit hash value h. The K bits are stored in the register 1102 as data to which the hash-function is applied next.

The above operation is repeated until a predetermined block is reached. The hash value obtained from the predetermined block is output as digital signature data.

The lower K bits of the random number R, for example, can be used as an initial value required for the first hash-function calculation, as shown in FIG. 14.

(3) Third Operation Mode

A third operation mode will be described below by referring to FIG. 13. FIG. 13 is a block diagram of a part of the control/calculation section 206.

Figure 13:
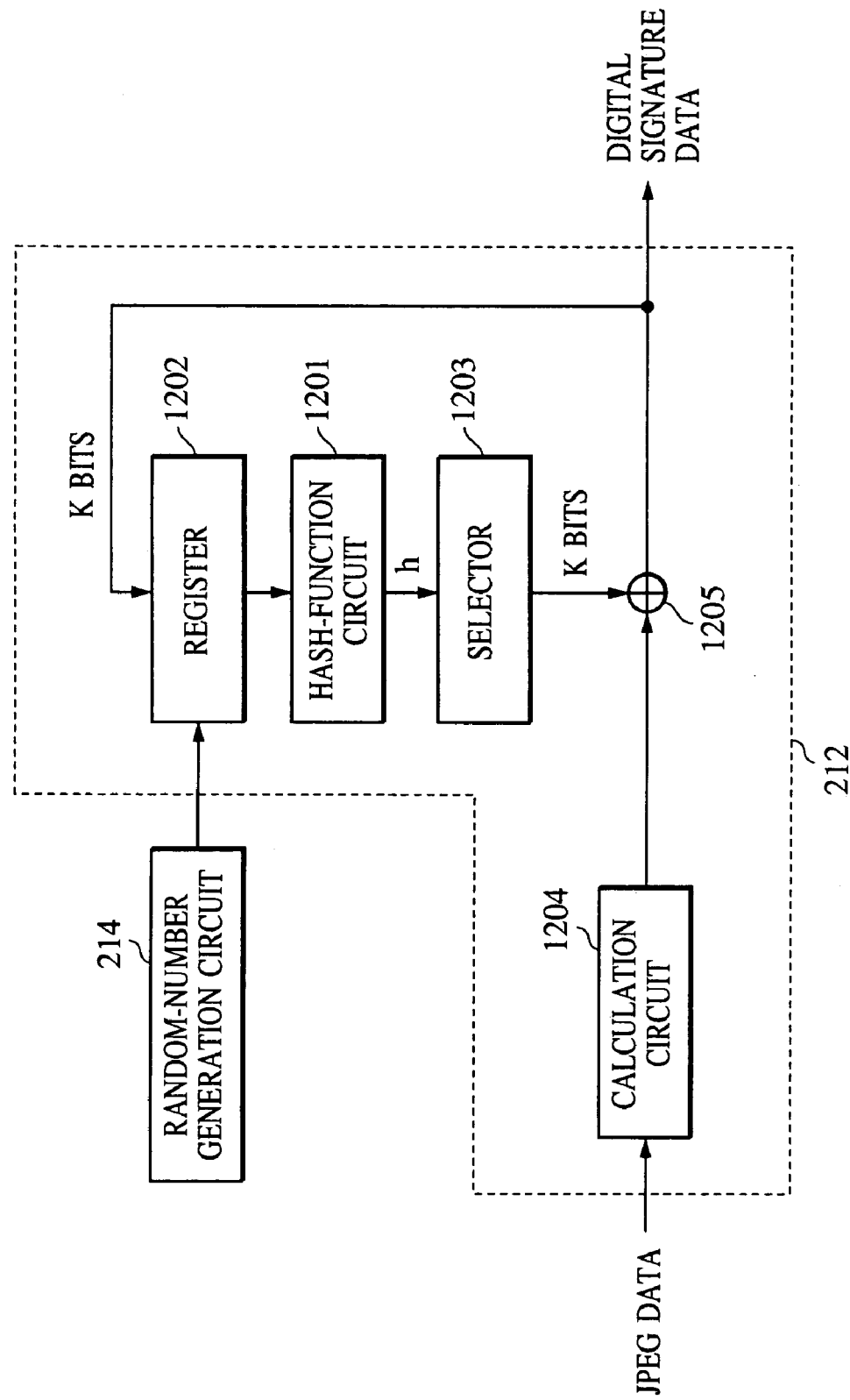
FIG. 13 is a view showing a third operation mode of the hash-function calculation according to the second embodiment.

In FIG. 13, the calculation circuit 212 is formed of a hash-function circuit 1201 for performing a hash-function calculation in units of predetermined bits, a register 1202 for sending a required input value to the hash-function circuit 1201, a selector 1203 for outputting a part of the output h (K bits) of the hash-function circuit 1201, a calculation circuit 1204 for dividing the JPEG data into blocks each having K bits, and a calculation circuit 1205 for applying an exclusive-OR calculation to the output of the selector 1203 and the output of the calculation circuit 1204.

The hash-function circuit 1201 applies a hash function to the value held by the register 1202, which has the confidential information generated by the random-number generation circuit 214 as an initial value.

A 128-bit hash value h, which is the output of the hash-function circuit 1201, is input to the selector 1203. The selector 1203 outputs, for example, the lower K bits of the 128-bit hash value h. The K bits are exclusive-ORed with one block of the JPEG data, and a part of the calculation result is stored in the register 1202.

The above operation is repeated until a predetermined block is reached. The hash value obtained from the predetermined block is output as digital signature data.

The lower K bits of the random number R, for example, can be used as an initial value required for the first hash-function calculation, as shown in FIG. 14.

In a step S608, the recording and reproduction section 203 records the digital signature data h generated by the control/calculation section 206 and the corresponding digital image data P into a removable recording medium or outputs them to an apparatus through the network.

A program for controlling the processing procedure shown in FIG. 7 is stored in the ROM 207. This program is read by the control/calculation section 206 (actually, the control circuit 210 included therein) and activated every time the user instructs image capturing.

As described above, in the second embodiment, the predetermined calculation is performed with the use of the highly-efficiently-encoded digital image data P and the confidential information S generated from the random number R having the predetermined length, and the hash function is applied to the result of the calculation to generate the digital signature data h. With these operations, the digital signature data h, which is safer and more reliable than that produced by the conventional system, is obtained with a simple structure in the second embodiment. In addition, a more inexpensive apparatus than in the conventional system can be implemented and higher-speed processing than in the conventional system can be achieved.

Since the hash-function calculation can be implemented by one of the above-described operation modes or by a combination thereof in the second embodiment, a safer digital-signature-data generation algorithm than in the first embodiment is provided.

In the second embodiment, an image input apparatus which captures the digital image data P can be identified with the use of the digital signature data h as in the first embodiment.

Third Embodiment

In the first and second embodiments, the procedures for generating digital signature data h with the use of the hash function have been described.

On the other hand, in a third embodiment, a procedure for generating digital signature data h with the use of, not a hash function but common-key encryption will be described in detail.

Figure 15:
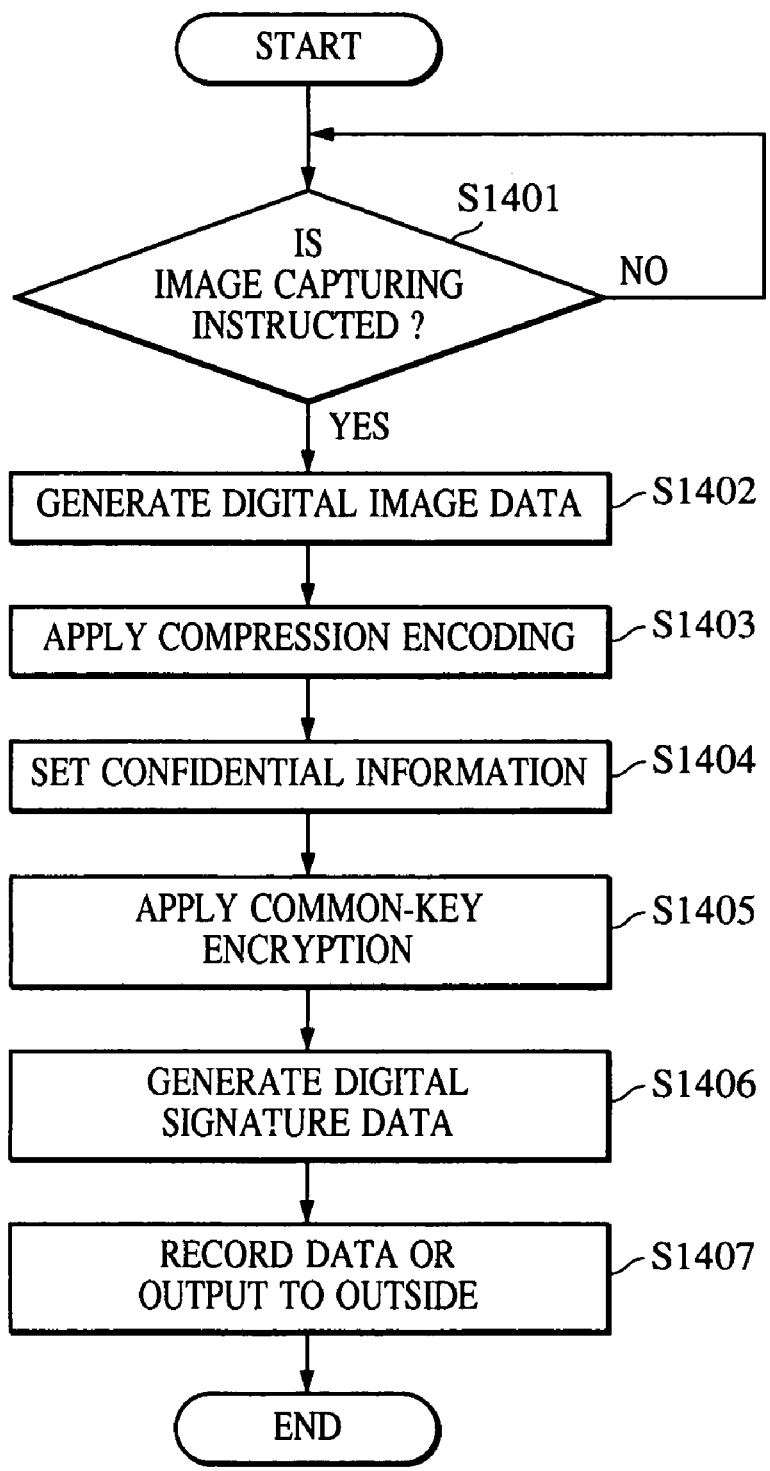
FIG. 15 is a flowchart of a processing procedure according to a third embodiment.

FIG. 15 is a flowchart showing a processing procedure according to the third embodiment. The procedure for generating digital signature data h will be described below by referring to FIG. 15.

Since processes in steps S1401 to S1403 are the same as those in the steps S401 to S403 in the first embodiment, a description thereof will be omitted.

In a step S1404, the control/calculation section 206 reads confidential information S unique to the image input apparatus 10 from the memory 213. In the third embodiment, it is assumed that the confidential information S is set to "1111 . . . . 1111."

In a step S1405, the control/calculation section 206 (actually, the calculation circuit 212 included therein) encrypts JPEG data stored in the working memory 202 by a common-key encryption method. An encryption key used for encrypting the JPEG data by the common-key encryption method is generated from the confidential information S.

Figure 16:
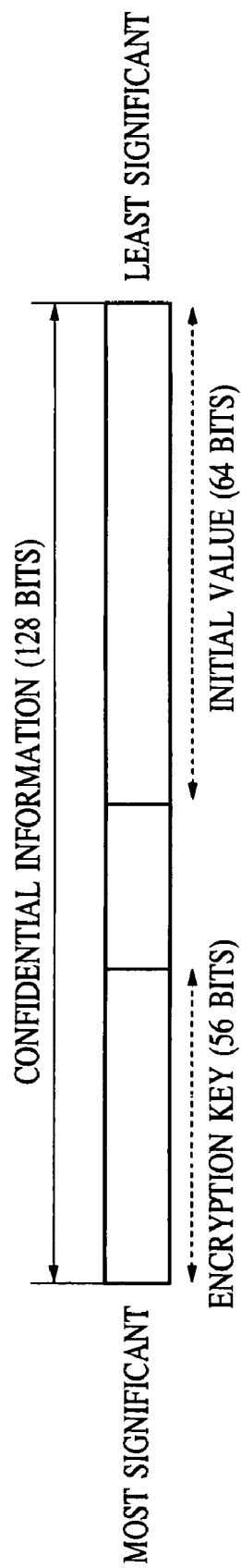
FIG. 16 is a view showing confidential information according to the third embodiment.

Various types of common-key encryption methods have been proposed. In the third embodiment, a DES method is used. Since the bit length of an encryption key is 56 in the DES method, the higher 56 bits of the confidential information S are used as an encryption key, as shown in FIG. 16. The bit length of an encryption key depends on the type of the common-key encryption method used. Therefore, when a FEAL-nX method, a MITSY method, or an IDEA method is used, since an encryption key has 128 bits, the higher 128 bits of the confidential information S are used as an encryption key. When a FEAL-n method or a MULTI2 method is used, since an encryption key has 64 bits, the higher 64 bits of the confidential information S are used as an encryption key.

Common-key encryption processing performed in the step S1405 will be described below in detail.

The control/calculation section 206 encrypts the JPEG data by any one of three operation modes, a cipher block chaining (CBC) mode, a cipher feedback (CFB) mode, and an output feedback (OFB) mode, described later, or by a combination thereof. In any operation mode, since encryption is achieved while input data is disturbed, safer encryption processing is performed.

(1) CBC Mode

Figure 17:
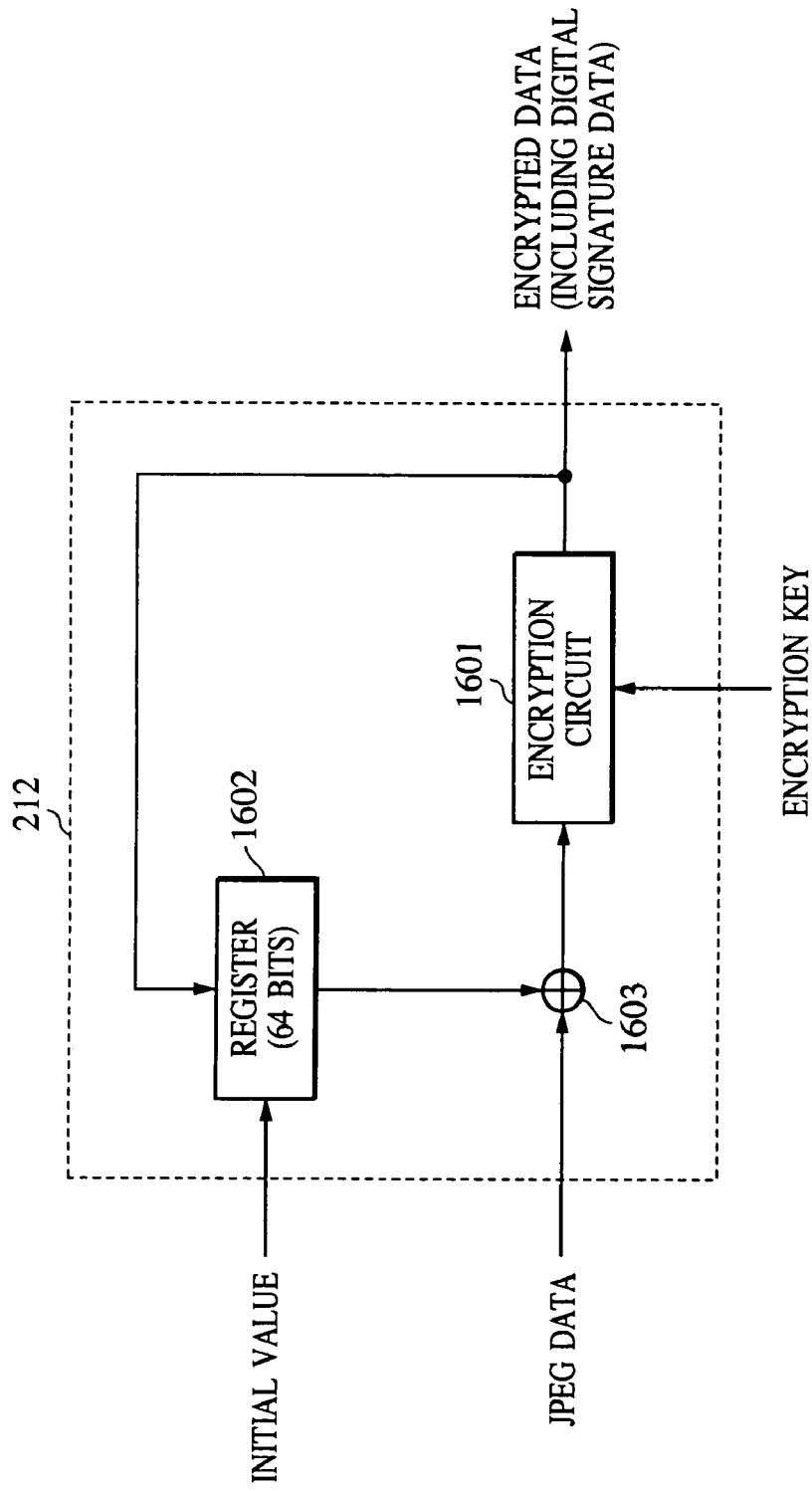
FIG. 17 is a view showing a cipher-block-chaining (CBC) mode according to the third embodiment.

The CBC mode will be described below by referring to FIG. 17. FIG. 17 is a block diagram of a part (the calculation circuit 212) of the control/calculation section 206.

In FIG. 17, the calculation circuit 212 is formed of an encryption circuit 1601 for performing encryption in units of 64 bits, a register 1602 for temporarily storing the output of the encryption circuit 1601, and a calculation circuit 1603 for applying an exclusive-OR calculation to the JPEG data and the output of the register 1602.

The encryption circuit 1601 encrypts the JPEG data in units of blocks each formed of 64 bits. The output of the encryption circuit 1601 is temporarily stored in the register 1602. Data of 64 bits stored in the register 1602 is exclusive-ORed with the next block, and the result of the calculation is sent to the encryption circuit 1601. Finally, the result obtained by encrypting all blocks is output as encrypted data. A part of this encrypted data serves as digital signature data h.

In the first block encryption, an initial value needs to be stored in the register 1602. The lower 64 bits of the confidential information S, for example, can be used as an initial value, as shown in FIG. 16.

If the size of a block is not a multiple of 64 bits, the remaining bit string may be encrypted, for example, by a combination of the CBC mode and the OFB mode, described later.

(2) OFB Mode

Figure 18:
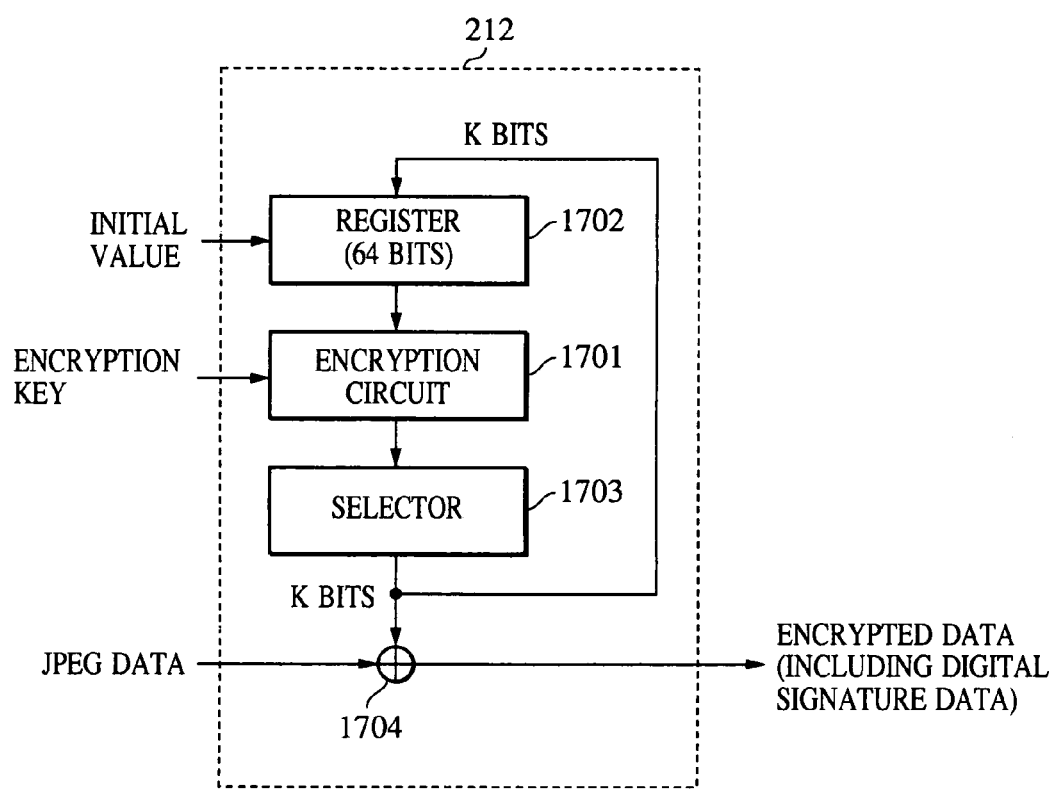
FIG. 18 is a view showing a cipher-feedback (CFB) mode according to the third embodiment.

The OFB mode will be described below by referring to FIG. 18. FIG. 18 is a block diagram of a part (the calculation circuit 212) of the control/calculation section 206.

In FIG. 18, the calculation circuit 212 is formed of an encryption circuit 1701 for performing encryption in units of 64 bits, a register 1702 for sending a required input value to the encryption circuit 1701, a selector 1703 for selectively outputting the output of the encryption circuit 1701, and a calculation circuit 1704 for applying an exclusive-OR calculation to the JPEG data and the output of the selector 1703.

The encryption circuit 1701 encrypts 64-bit data stored in the register 1702. The output of the encryption circuit 1701 is input to the selector 1703. The selector 1703 outputs, for example, the lower K bits. The K bits are stored in the register 1702 as data to be encrypted next. The K bits output from the selector 1703 are also exclusive-ORed with each block (one block comprises K bits) of JPEG data, and the result of the calculation is used as encrypted data. A part of this encrypted data serves as digital signature data h.

The lower 64 bits of the confidential information S, for example, can be used as an initial value required for the first encryption, as shown in FIG. 16.

(3) CFB Mode

Figure 19:
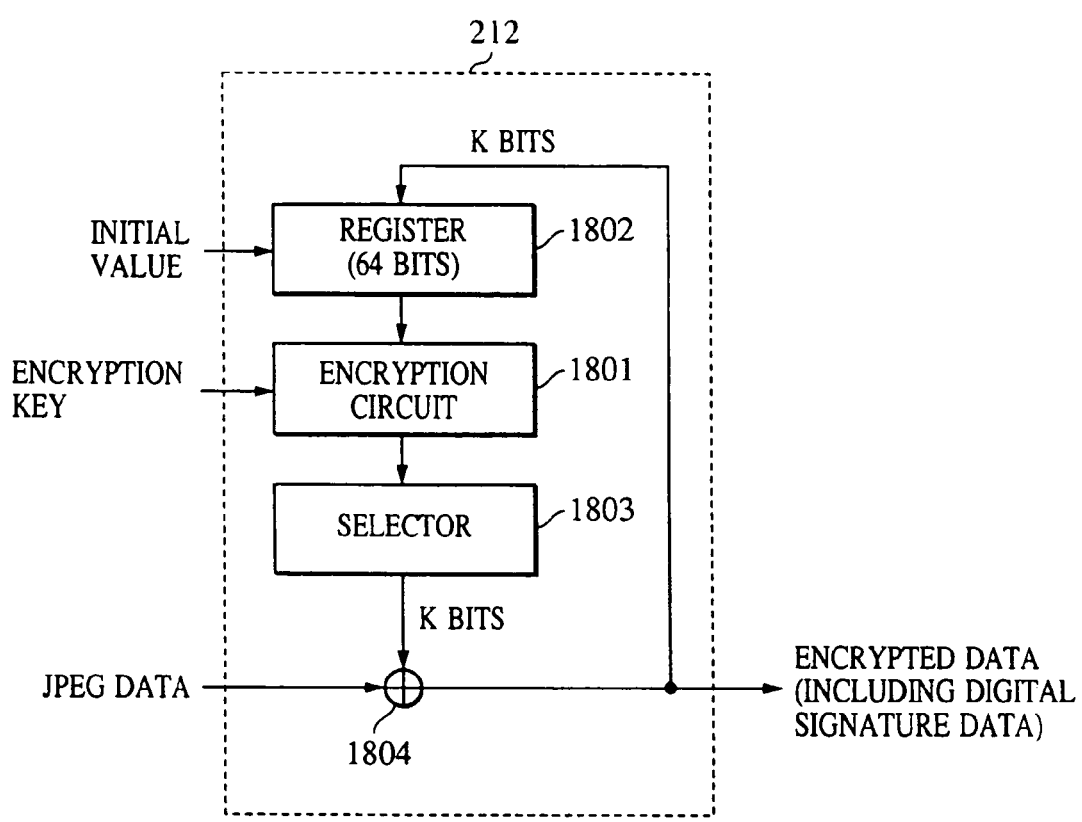
FIG. 19 is a view showing an output-feedback (OFB) mode according to the third embodiment.

The CFB mode will be described below by referring to FIG. 19. FIG. 19 is a block diagram of a part (the calculation circuit 212) of the control/calculation section 206.

In FIG. 19, the calculation circuit 212 is formed of an encryption circuit 1801 for performing encryption in units of 64 bits, a register 1802 for sending a required input value to the encryption circuit 1801, a selector 1803 for selectively outputting the output of the encryption circuit 1801, and a calculation circuit 1804 for applying an exclusive-OR calculation to the JPEG data and the output of the selector 1803.

The encryption circuit 1801 encrypts 64-bit data stored in the register 1802. The output of the encryption circuit 1801 is input to the selector 1803. The selector 1803 outputs, for example, the lower K bits. The K bits output from the selector 1803 are also exclusive-ORed with one block (K bits) of JPEG data, and the result of the calculation is again stored in the register 1802. Finally, the result obtained by processing all blocks is output as encrypted data. A part of this encrypted data serves as digital signature data h.

The lower 64 bits of the confidential information S, for example, can be used as an initial value required for the first encryption, as shown in FIG. 16.

In a step S1406, the control/calculation section 206 (actually, the calculation circuit 212 included therein) extracts a predetermined bit string from the encrypted data generated in the step S1405 as digital signature data. The lower 128 bits of the encryption data is, for example, used as digital signature data.

In a step S1407, the recording and reproduction section 203 records the digital signature data h generated by the control/calculation section 206 (actually, the calculation circuit 212 included therein) and the corresponding digital image data P into a removable recording medium or outputs them to an apparatus through the network.

A program for controlling the processing procedure shown in FIG. 15 is stored in the ROM 207. This program is read by the control/calculation section 206 (actually, the control circuit 210 included therein) and activated every time the user instructs image capturing.

As described above, in the third embodiment, encryption is performed by the common-key encryption method with the use of the highly-efficiently-encoded digital image data P and the encryption key generated from a part of the confidential information S, and the digital signature data h is generated from the encrypted data. With these operations, the digital signature data h, which is safer and more reliable than that produced in the first and second embodiments, is obtained in the third embodiment. In addition, a more inexpensive apparatus than in the conventional system can be implemented and higher-speed processing than in the conventional system can be achieved.

In the third embodiment, an image input apparatus which has captured the digital image data can be identified with the use of the digital signature data h.

The confidential information S is set to "1111 . . . 1111" (128 bits long) in the third embodiment. The present invention is not limited to this case. The confidential information S can be set to a random number generated according to a predetermined algorithm by the random-number generation circuit 214. In this case, the confidential information S is shared with the image verification apparatus 20.

Fourth Embodiment

In the third embodiment, the procedure for generating digital signature data h with the use of, not a hash function but common-key encryption has been described.

On the other hand, in a fourth embodiment, a procedure for performing a predetermined calculation (such as a calculation, including bit insertion, for which an inverted calculation is allowed), for encrypting the result of the predetermined calculation by a common-key encryption method, and for generating digital signature data h from encrypted data will be described.

Figure 20:
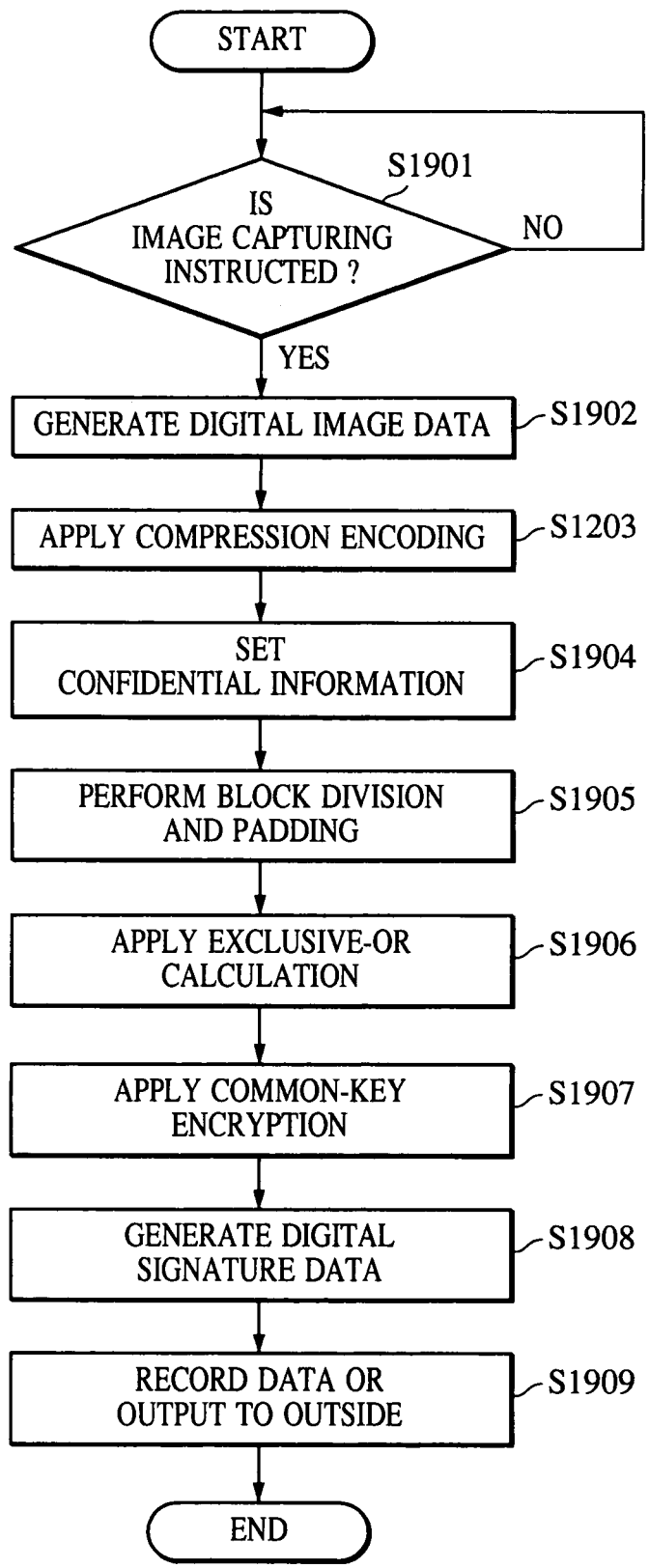
FIG. 20 is a flowchart of a processing procedure according to a fourth embodiment.

FIG. 20 is a flowchart showing a processing procedure in the fourth embodiment. The procedure for generating digital signature data h will be described below by referring to FIG. 20.

Since processes in steps S1901 to S1903 are the same as those in the steps S401 to S403 in the first embodiment, a description thereof will be omitted.

Since processes in steps S1904 to S1906 are the same as those (exclusive-OR calculation by using the bit Ri of the random number R, which serves as confidential information, and the block Di of the JPEG data) in the steps S604 to S606 in the second embodiment, a description thereof will be omitted.

In the step S1906, an exclusive-OR calculation is performed between the bit Ri of the random number R and the least significant bit of the block Di in the same way as in the step S606. The present invention is not limited to this case. Any calculation may be used if at least a part of each block Di is added to, combined with, or multiplexed with a part of the confidential information S (random number R having a bit length m) and an inverted calculation of it is allowed.

Figure 21:
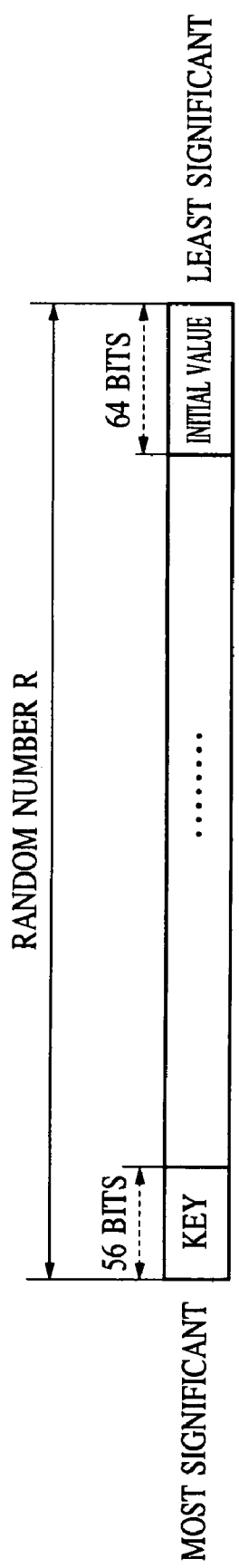
FIG. 21 is a view showing confidential information according to the fourth embodiment.

In a step S1907, the control/calculation section 206 (actually, the calculation circuit 212 included therein) encrypts the output of the step S1906 by a common-key encryption method. It is assumed that the control/calculation section 206 uses the DES method in the same way as in the third embodiment, and the higher 56 bits of the confidential information S generated in the step S1904 are used as an encryption key, as shown in FIG. 21.

Encryption processing performed in the step S1907 will be described below in detail.

The control/calculation section 206 sequentially encrypts the result obtained by applying an exclusive-OR to the bit Ri of the random number R and the block Di of the JPEG data by any one of the above-described three operation modes (the CBC mode, the CFB mode, and the OFB mode) or by a combination thereof. Since encryption is achieved while input data is disturbed in any operation mode, safer encryption is implemented.

In a step S1908, the control/calculation section 206 (actually, the calculation circuit 212 included therein) extracts a predetermined bit string as digital signature data h from encrypted data generated in the step S1907. The lower 128 bits of the encrypted data, for example, serve as digital signature data h.

In a step S1909, the recording and reproduction section 203 records the digital signature data h generated by the control/calculation section 206 (actually, the calculation circuit 212 included therein) and the corresponding digital image data P into a removable recording medium or outputs them to an apparatus through the network.

A program for controlling the processing procedure shown in FIG. 20 is stored in the ROM 207. This program is read by the control/calculation section 206 (actually, the control circuit 210 included therein) and activated every time the user instructs image capturing.

As described above, in the fourth embodiment, the predetermined calculation is performed with the use of the confidential information S generated from the random number R, and the highly-efficiently-encoded digital image data P, the result of the calculation is encrypted by the common-key encryption method, and the digital signature data h is generated from the encrypted data. With these operations, digital signature data which is safer and more reliable than that produced in the third embodiment is obtained in the fourth embodiment. In addition, a more inexpensive apparatus than in the conventional system can be implemented and higher-speed processing than in the conventional system can be achieved.

In the fourth embodiment, an image input apparatus which has captured the digital image data P can be identified with the use of the digital signature data h.

Fifth Embodiment

In the first to fourth embodiments, digital signature data h is generated according to confidential information S unique to the image input apparatus 10. Therefore, an image input apparatus which has captured the digital image data P can be identified with the use of the digital signature data h.

On the other hand, in the fifth embodiment, an external apparatus, such as an IC card, is connected to the image input apparatus 10 and digital signature data h is generated according to confidential information S unique to the external apparatus. The confidential information S which the external apparatus has can, for example, be ID information for identifying the image input apparatus 10, or ID information for identifying the user who uses the image input apparatus 10. With such a structure, in the fifth embodiment, it can be determined by the use of the digital signature data h which image input apparatus connected to which external apparatus has captured digital image data or which user who instructed the image input apparatus to capture digital image data has captured the digital image data.

Figure 22:
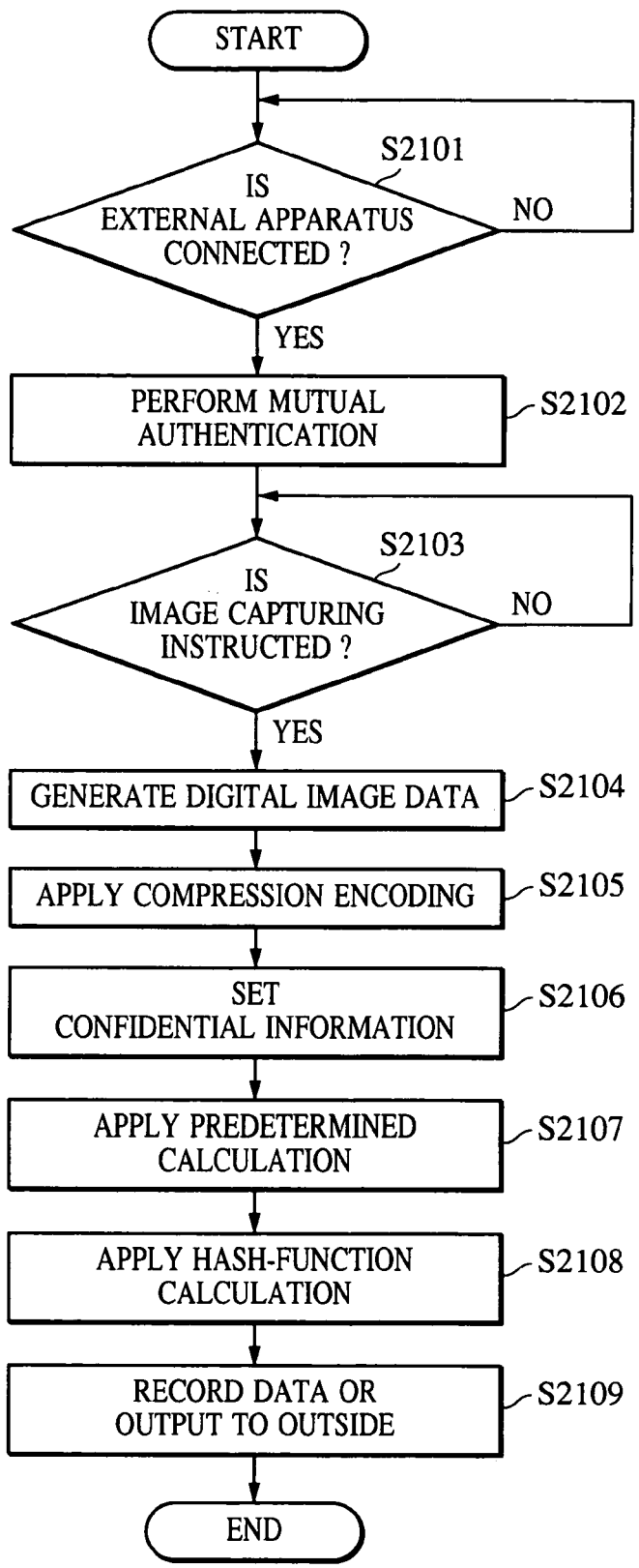
FIG. 22 is a flowchart of processing procedures according to fifth and sixth embodiments.

FIG. 22 is a flowchart showing a processing procedure according to the fifth embodiment. A procedure for generating digital signature data h will be described below by referring to FIG. 22.

In a step S2101, the control/calculation section 206 of the image input apparatus 10 determines whether an external apparatus 40 is connected to the external interface section 205.

In a step S2102, the image input apparatus 10 and the external apparatus 40 perform mutual authentication to check if they are legitimate to each other.

Figure 23:
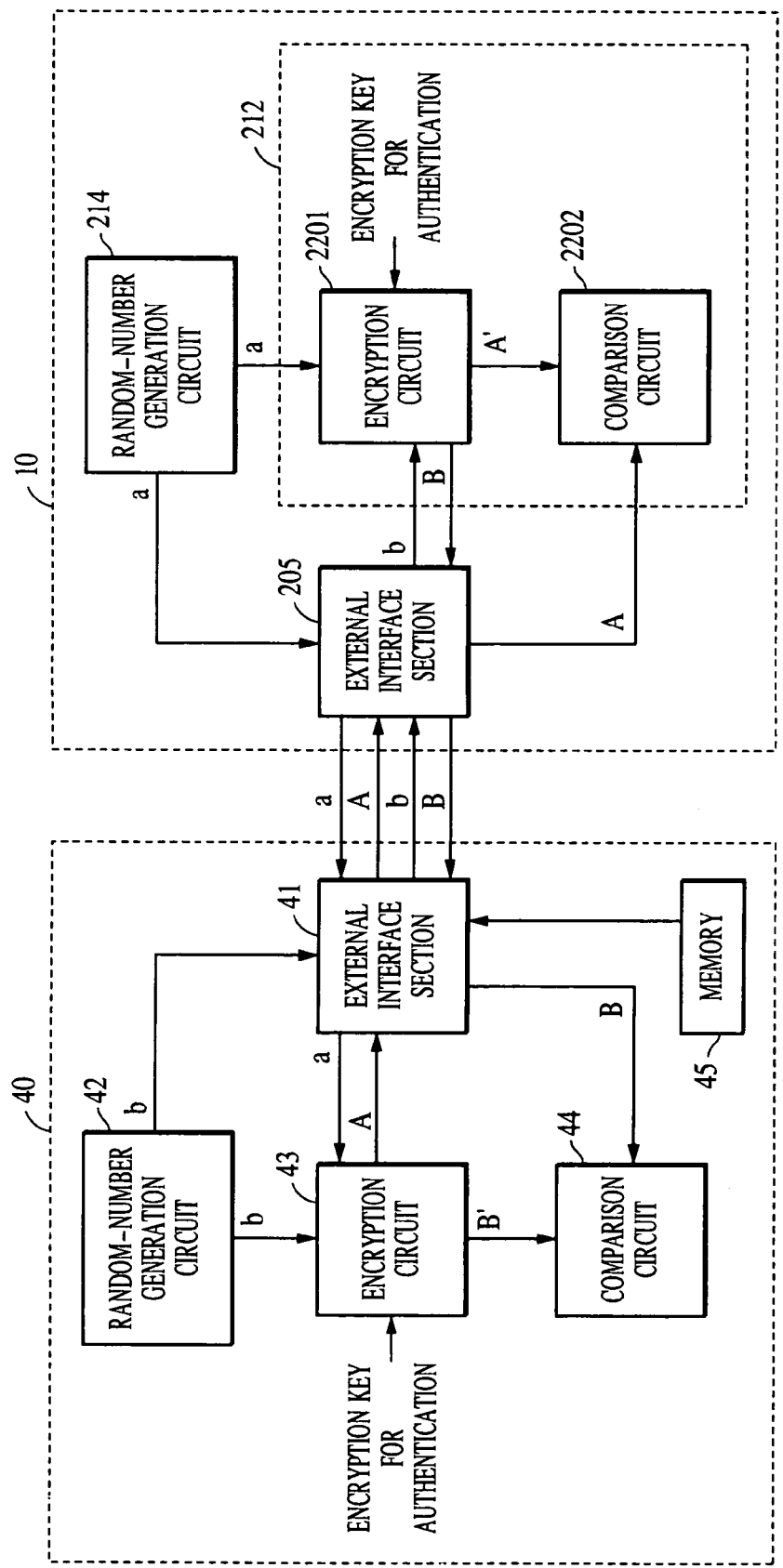
FIG. 23 is a view showing an image input apparatus and an external apparatus.

A mutual authentication process between the image input apparatus 10 and the external apparatus 40 will be described below by referring to FIG. 23.

The image input apparatus 10 generates a random number "a" for authentication by using the random-number generation circuit 214, and sends the random number "a" to the external apparatus 40 through the external interface section 205.

An encryption circuit 43 in the external apparatus 40 converts the random number "a" to data A with the use of an encryption key for authentication, and sends the encrypted data A to the image input apparatus 10 through an external interface section 41.

An encryption circuit 2201 in the image input apparatus 10 converts the random number "a" to data A' with the use of an encryption key for authentication. A comparison circuit 2202 compares the encrypted data A' with the encrypted data A sent from the external apparatus 40, and authenticates the external apparatus 40 if they match.

In the same way, the external apparatus 40 generates a random number "b" for authentication by using a random-number generation circuit 42, and sends the random number "b" to the image input apparatus 10 through the external interface section 41.

The encryption circuit 2201 in the image input apparatus 10 converts the random number "b" to data B with the use of an encryption key for authentication, and sends the encrypted data B to the external apparatus 40 through the external interface section 205.

The encryption circuit 43 in the external apparatus 40 converts the random number "b" to data B' with the use of an encryption key for authentication. A comparison circuit 44 compares the encrypted data B' with the encrypted data B sent from the image input apparatus 10, and authenticates the image input apparatus 10 if they match.

When both sides are authenticated correctly, the external apparatus 40 sends confidential information S stored in a memory 45 to the image input apparatus 10 through the external interface section 41.

Since processes in steps S2103 to S2105 are the same as those in the steps S401 to S403 in the first embodiment, a description thereof will be omitted.

In a step S2106, the control/calculation section 206 stores the confidential information S input through the external interface section 205 to the memory 213.

In a step S2107, the control/calculation section 206 (actually, the calculation circuit 212 included therein) performs a predetermined calculation based on a rule determined in advance, by the use of the confidential information S and digital image data P (hereinafter called JPEG data) highly efficiently encoded by the JPEG method. The calculation circuit 212 executes the same calculation as that in the step S405 in the first embodiment.

In a step S2108, the control/calculation section 206 (actually, the calculation circuit 212 included therein) applies a hash-function calculation to the calculation result obtained in the step S2107, and generates digital signature data h from the result of the hash-function calculation. The calculation circuit 212 executes the same calculation processing as that in the step S406 in the first embodiment.

In a step S2109, the recording and reproduction section 203 records the digital signature data h generated by the control/calculation section 206 (actually, the calculation circuit 212 included therein) and the corresponding digital image data P into a removable recording medium or outputs them to an apparatus through the network.

A program for controlling the processing procedure shown in FIG. 22 is stored in the ROM 207. This program is read by the control/calculation section 206 (actually, the control circuit 210 included therein) and activated every time the user instructs image capturing. Therefore, every time a digital image is captured, the digital signature data h corresponding to the image is generated.

As described above, in the fifth embodiment, the predetermined calculation is performed with the use of the confidential information S which the external apparatus 40 has, and the highly-efficiently-encoded digital image data P, the result of the calculation is operated by the hash function, and the digital signature data h is generated from the result of the hash-function calculation. With these operations, digital signature data which is safer and more reliable than that produced in the conventional system is obtained in the fifth embodiment. In addition, a more inexpensive apparatus than in the conventional system can be implemented and higher-speed processing than in the conventional system can be achieved.

As a result, without obtaining the confidential information S of the external apparatus and the predetermined calculation, the digital signature data h corresponding to the digital image data P cannot generated illegitimately. Therefore, the integrity of the digital image data P is safely verified according to the digital signature data h. In addition, due to the nature of the one-way function, since the original data, that is, the digital image data P to which the predetermined calculation is applied with the use of the confidential data S, cannot be obtained from the digital signature data h, the integrity of the digital image data P is verified from the digital signature data h in a safe condition.

A user who has instructed to capture digital image data can be identified with the use of the digital signature data h.

In the fifth embodiment, the procedure for generating the digital signature data h is the same as that in the first embodiment. The present invention is not limited to this case. Any of the procedures for generating digital image data h used in the above second to fourth embodiments can also be applied.

Sixth Embodiment

In the fifth embodiment, the image input apparatus 10 is connected to the external apparatus 40, and the digital signature data is generated according to the unique confidential information which the external apparatus 40 has.

On the other hand, in a sixth embodiment, the image input apparatus 10 is connected to the external apparatus 40, and digital image data h is generated according to both confidential information S2 unique to the external apparatus 40 and confidential information S1 unique to the image input apparatus 10. With such a structure, in the sixth embodiment, it can be determined by the use of digital signature data h which image input apparatus connected to which external apparatus has captured digital image data P or which user who instructed which image input apparatus to capture digital image data P has captured the digital image data.

A processing procedure used in the sixth embodiment will be described below in detail by referring to FIG. 22.

In a step S2101, the control/calculation section 206 of the image input apparatus 10 determines whether an external apparatus 40 is connected to the external interface section 205.

In a step S2102, the image input apparatus 10 and the external apparatus 40 perform mutual authentication to check if they are legitimate to each other.

Since processes in steps S2103 to S2105 are the same as those in the steps S401 to S403 in the first embodiment, a description thereof will be omitted.

In a step S2106, the control/calculation section 206 reads the confidential information S1 which the image input apparatus 10 has from the memory 213, and receives the confidential information S2 which the external apparatus 40 has through the external interface 205. The control/calculation section 206 combines them to form new confidential information S.

Assuming that the confidential information S1 of the image input apparatus 10 is "1111" and the confidential information S2 of the external apparatus 40 is "0000," for example, the confidential information S newly generated is, for example, "11110000." In the sixth embodiment, the two confidential-information items are simply combined to form the new confidential information S. Any operation may be used if the confidential information S1 and S2 can be processed from the confidential information S.

In a step S2107, the control/calculation section 206 (actually, the calculation circuit 212 included therein) performs a predetermined calculation based on a rule determined in advance, by the use of the confidential information S and digital image data P (hereinafter called JPEG data) highly efficiently encoded by the JPEG method. The calculation circuit 212 executes the same calculation as that in the step S405 in the first embodiment.

In a step S2108, the control/calculation section 206 (actually, the calculation circuit 212 included therein) applies a hash-function calculation to the calculation result obtained in the step S2107, and generates digital signature data h from the result of the hash-function calculation.

In a step S2109, the recording and reproduction section 203 records the digital signature data h generated by the control/calculation section 206 and the corresponding digital image data P into a removable recording medium or outputs them to an apparatus through the network.

A program for controlling the processing procedure shown in FIG. 22 is stored in the ROM 207. This program is read by the control/calculation section 206 (actually, the control circuit 210 included therein) and activated every time the user instructs image capturing. Therefore, every time a digital image is captured, the digital signature data corresponding to the image is generated.

As described above, in the sixth embodiment, the predetermined calculation is performed with the use of the confidential information S generated from the confidential information S1 of the image input apparatus 10 and the confidential information S2 of the external apparatus 40 and the highly-efficiently-encoded digital image data P, the result of the calculation is operated by the hash function, and the digital signature data h is generated from the result of the calculation. With these operations, digital signature data which is safer and more reliable than that produced in the conventional system is obtained in the sixth embodiment. In addition, a more inexpensive apparatus than in the conventional system can be implemented and higher-speed processing than in the conventional system can be achieved.

It can be determined by the use of digital signature data h which image input apparatus connected to which external apparatus has captured digital image data or which user who instructed which image input apparatus to capture digital image data has captured the digital image data.

In the sixth embodiment, the procedure for generating the digital signature data h is the same as that in the first embodiment. The present invention is not limited to this case. Any of the procedures for generating digital image data h used in the above second to fourth embodiments can also be applied.

Seventh Embodiment

In a seventh embodiment, an image verification apparatus 20 for checking the integrity of digital image data P with the use of the digital signature data h generated by the image input apparatus 10 according to the first embodiment will be described.

Figure 24:
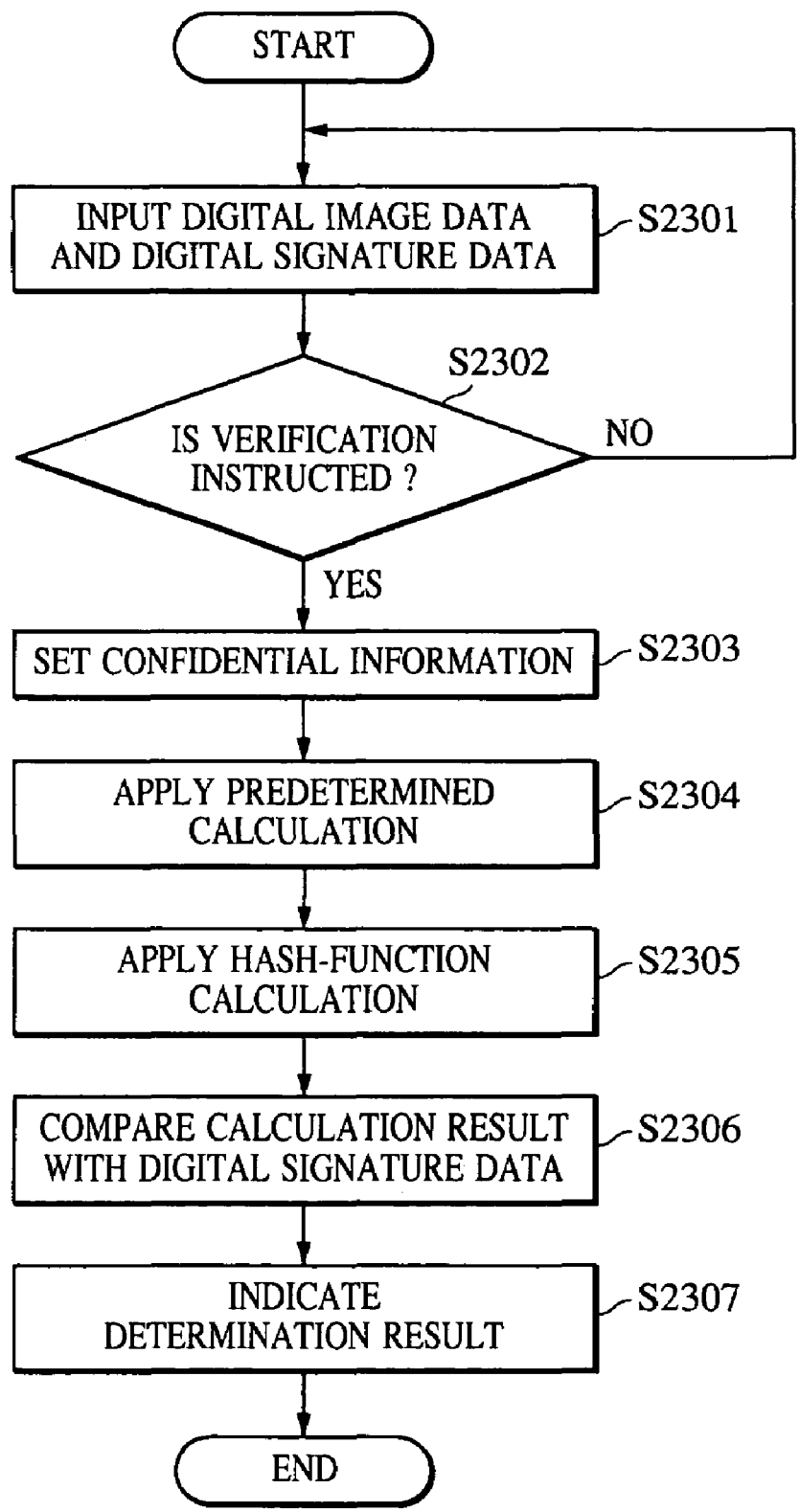
FIG. 24 is a flowchart of a processing procedure according to a seventh embodiment.

FIG. 24 is a flowchart showing a processing procedure according to the seventh embodiment. A procedure for verifying digital image data P in the image verification apparatus 20 will be described below by referring to FIG. 24.

In a step S2301, the external interface section 301 inputs digital image data P and the corresponding digital signature data h generated by the image input apparatus 10 and stores them in the working memory 302 in the image verification apparatus 20. The digital image data P (hereinafter just called JPEG data) has been highly efficiently encoded, for example, by the JPEG method.

In a step S2302, the operation section 306 determines whether the integrity of JPEG data is verified, according to a user's operation input. When verification is instructed, the control/calculation section 303 executes a step S2303.

In the step S2303, the control/calculation section 303 reads confidential information S from the memory 313. The confidential information S is confidentially shared by the image input apparatus 10 according to the first embodiment and the image verification apparatus 20 according to the present embodiment. The confidential information S of the present embodiment is set to "11111111" in the same way as in the first embodiment. The confidential information S is stored in a read-only recording medium and it is managed such that it cannot be output to the outside.

In a step S2304, the control/calculation section 303 (actually, the calculation circuit 312 included therein) executes the same calculation as in the step S405 in the first embodiment, with the use of the confidential information S and the JPEG data. The least significant byte of the JPEG data and the confidential information S are exclusive-ORed in units of bits.

In a step S2305, the control/calculation section 303 (actually, the calculation circuit 312 included therein) applies a hash-function calculation to the result of the calculation performed in the step S2304. The same hash function as that used in the first embodiment is used. The same process as in the step S406 is used in this step.

In a step S2306, the control/calculation section 303 (actually, the calculation circuit 312 included therein) compares the result of the calculation performed in the step S2305 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2307, the display section 304 shows an image or a message indicating that the selected JPEG data is legitimate and illegitimate processing is not applied, when the comparison result is affirmative in the step S2305. If the comparison result is negative, a warning image or a warning message indicating that illegitimate processing has been applied is shown. With the operation, it is visually easy for the user to recognize the integrity of the selected JPEG data.

A program for controlling the processing procedure shown in FIG. 24 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the seventh embodiment, the integrity of the digital image data P which was captured and highly efficiently encoded by the image input apparatus 10 according to the first embodiment is recognized with a simpler structure than in the conventional system. In addition, a more inexpensive structure than in the conventional system can be implemented, and higher-speed processing can be achieved.

Eighth Embodiment

In an eighth embodiment, an image verification apparatus 20 for checking the integrity of digital image data P with the use of the digital signature data h generated by the image input apparatus 10 according to the second embodiment will be described.

Figure 25:
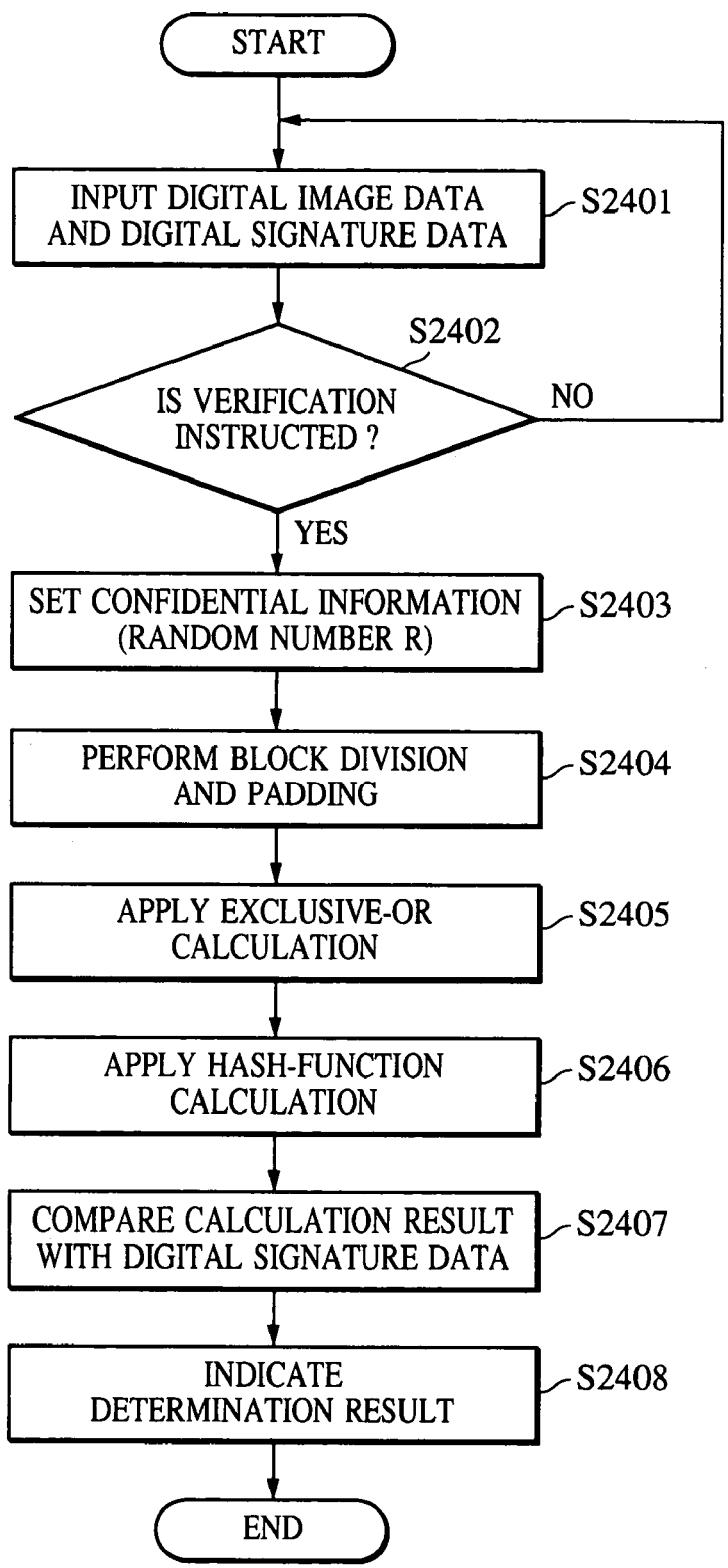
FIG. 25 is a flowchart of a processing procedure according to an eighth embodiment.

FIG. 25 is a flowchart showing a processing procedure according to the eighth embodiment. A procedure for verifying digital image data P in the image verification apparatus 20 will be described below by referring to FIG. 25.

Since processes in steps S2401 and S2402 are the same as those in the steps S2301 and S2302 in the seventh embodiment, a description thereof will be omitted.

In a step S2403, the control/calculation section 303 (actually, the random-number generation circuit included therein) generates a random number R (that is, confidential information S) having a bit length of m. A program for generating the random number R is stored in the ROM 305. This program is the same as that held by the image input apparatus 10 according to the second embodiment. The random number R is the same as the random number R used in the second embodiment. The program and the random number R are managed so as not to be output to the outside.

In a step S2404, the control/calculation section 303 (actually, the calculation circuit 312 included therein) divides a selected JPEG data into blocks Di (i=1 to n) each having 128 bits, as shown in FIG. 7. A block having a data amount of less than 128 bits is padded with "000 . . . 000." The process in the step S2404 is the same as that performed in the step S605 in the second embodiment.

In a step S2405, the control/calculation section 303 (actually, the calculation circuit 312 included therein) performs the same processing as in the step S606 in the second embodiment, by the use of the random number R and n blocks. Specifically, the bit Ri of the random number R and the least significant bit of the block Di are exclusive-ORed for i=1 to n.

In a step S2406, the control/calculation section 303 (actually, the calculation circuit 312 included therein) applies a hash-function calculation to the result of the calculation performed in the step S2405. The same hash function as that used in the second embodiment is used. The same process as in the step S607 is used in this step.

In a step S2407, the control/calculation section 303 (actually, the calculation circuit 312 included therein) compares the result of the calculation performed in the step S2406 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2408, the display section 304 shows an image or a message indicating the comparison result. With this operation, it is visually easy for the user to recognize the integrity of the selected JPEG data.

A program for controlling the processing procedure shown in FIG. 25 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the eighth embodiment, the integrity of digital image data P which was captured and highly efficiently encoded by the image input apparatus 10 according to the second embodiment is recognized with a simpler structure than in the conventional system. In addition, a more inexpensive structure than in the conventional system can be implemented, and higher-speed processing can be achieved.

Ninth Embodiment

In a ninth embodiment, an image verification apparatus 20 for checking the integrity of digital image data P with the use of digital signature data h generated by the image input apparatus 10 according to the third embodiment will be described.

Figure 26:
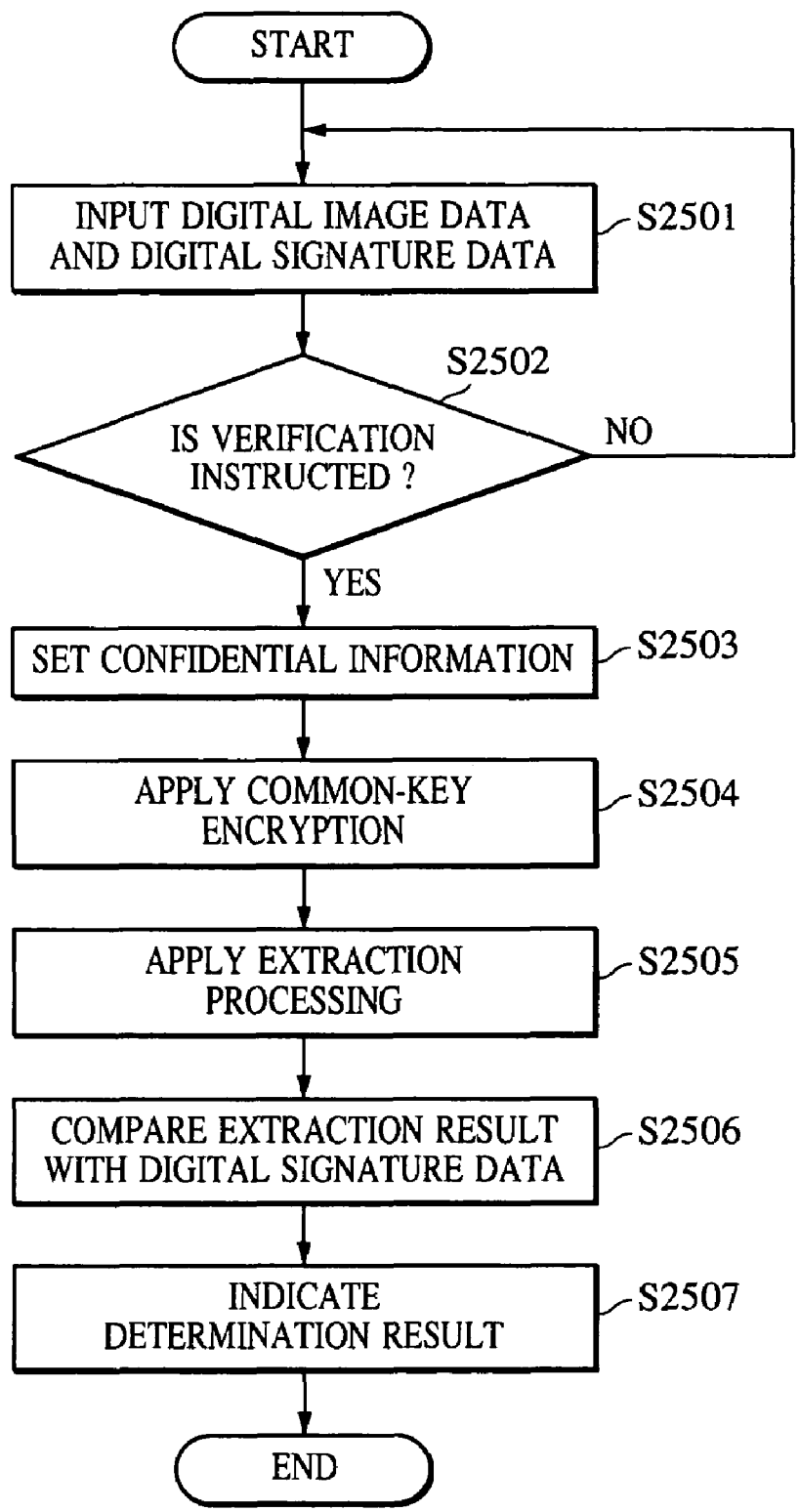
FIG. 26 is a flowchart of a processing procedure according to a ninth embodiment.

FIG. 26 is a flowchart showing a processing procedure according to the ninth embodiment. A procedure for verifying digital image data P in the image verification apparatus 20 will be described below by referring to FIG. 26.

Since processes in steps S2501 and S2502 are the same as those in the steps S2301 and S2302 in the seventh embodiment, a description thereof will be omitted.

In a step S2503, the control/calculation section 303 reads confidential information S from the memory 313. The confidential information S is confidentially shared by the image input apparatus 10 according to the third embodiment and the image verification apparatus 20 according to the present embodiment. The confidential information S of the present embodiment is set to "11111111" in the same way as in the third embodiment. The confidential information S is stored in a read-only recording medium, and it is managed such that it cannot be output to the outside.

In a step S2504, the control/calculation section 303 (actually, the calculation circuit 312 included therein) encrypts a selected JPEG data by a common-key encryption method in the same way as in the step S1405 in the third embodiment.

In a step S2505, the control/calculation section 303 (actually, the calculation circuit 312 included therein) extracts a predetermined bit string from the data encrypted in the step S2504. The lower 128 bits of the encrypted data, for example, is extracted in the same way as in the third embodiment.

In a step S2506, the control/calculation section 303 (actually, the calculation circuit 312 included therein) compares the result of the extraction performed in the step S2505 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2507, the display section 304 shows an image or a message indicating the comparison result. With this operation, it is visually easy for the user to recognize the integrity of the selected JPEG data.

A program for controlling the processing procedure shown in FIG. 26 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the ninth embodiment, the integrity of digital image data P which was captured and highly efficiently encoded by the image input apparatus 10 according to the third embodiment is recognized with a simpler structure than in the conventional system. In addition, a more inexpensive structure than in the conventional system can be implemented, and higher-speed processing can be achieved.

Tenth Embodiment

In a tenth embodiment, an image verification apparatus 20 for checking the integrity of digital image data P with the use of digital signature data h generated by the image input apparatus 10 according to the fourth embodiment will be described.

Figure 27:
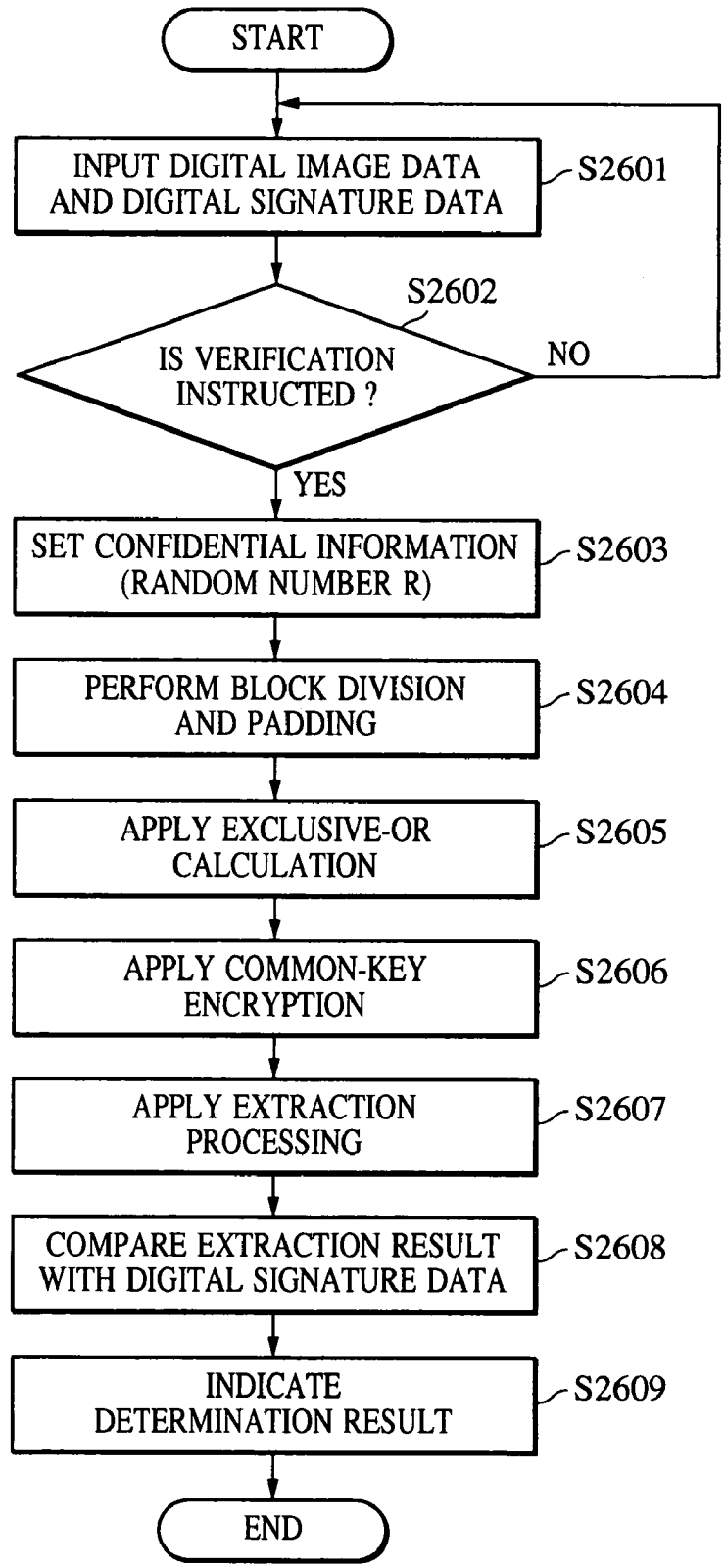
FIG. 27 is a flowchart of a processing procedure according to a tenth embodiment.

FIG. 27 is a flowchart showing a processing procedure in the tenth embodiment. A procedure for verifying digital image data P in the image verification apparatus 20 will be described below by referring to FIG. 27.

Since processes in steps S2601 and S2602 are the same as those in the steps S2301 and S2302 in the seventh embodiment, a description thereof will be omitted.

Since processes in steps S2603 to S2605 are the same as those in the steps S2403 to S2405 in the eighth embodiment, a description thereof will be omitted.

In a step S2606, the control/calculation section 303 (actually, the calculation circuit 312 included therein) encrypts a selected JPEG data by a common-key encryption method in the same way as in the step S1907 in the fourth embodiment.

In a step S2607, the control/calculation section 303 (actually, the calculation circuit 312 included therein) extracts a predetermined bit string from the data encrypted in the step S2606. The lower 128 bits of the encrypted data, for example, is extracted in the same way as in the third embodiment.

In a step S2608, the control/calculation section 303 (actually, the calculation circuit 312 included therein) compares the result of the extraction performed in the step S2607 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2609, the display section 304 shows an image or a message indicating the comparison result. With this operation, it is visually easy for the user to recognize the integrity of the selected JPEG data.

A program for controlling the processing procedure shown in FIG. 27 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the tenth embodiment, the integrity of digital image data P which was captured and highly efficiently encoded by the image input apparatus 10 according to the fourth embodiment is recognized with a simpler structure than in the conventional system. In addition, a more inexpensive structure than in the conventional system can be implemented, and higher-speed processing can be achieved.

Eleventh Embodiment

In an eleventh embodiment, an image verification apparatus 20 for checking the integrity of digital image data P with the use of the digital signature data h generated by the image input apparatus 10 according to the fifth embodiment will be described.

Figure 28:
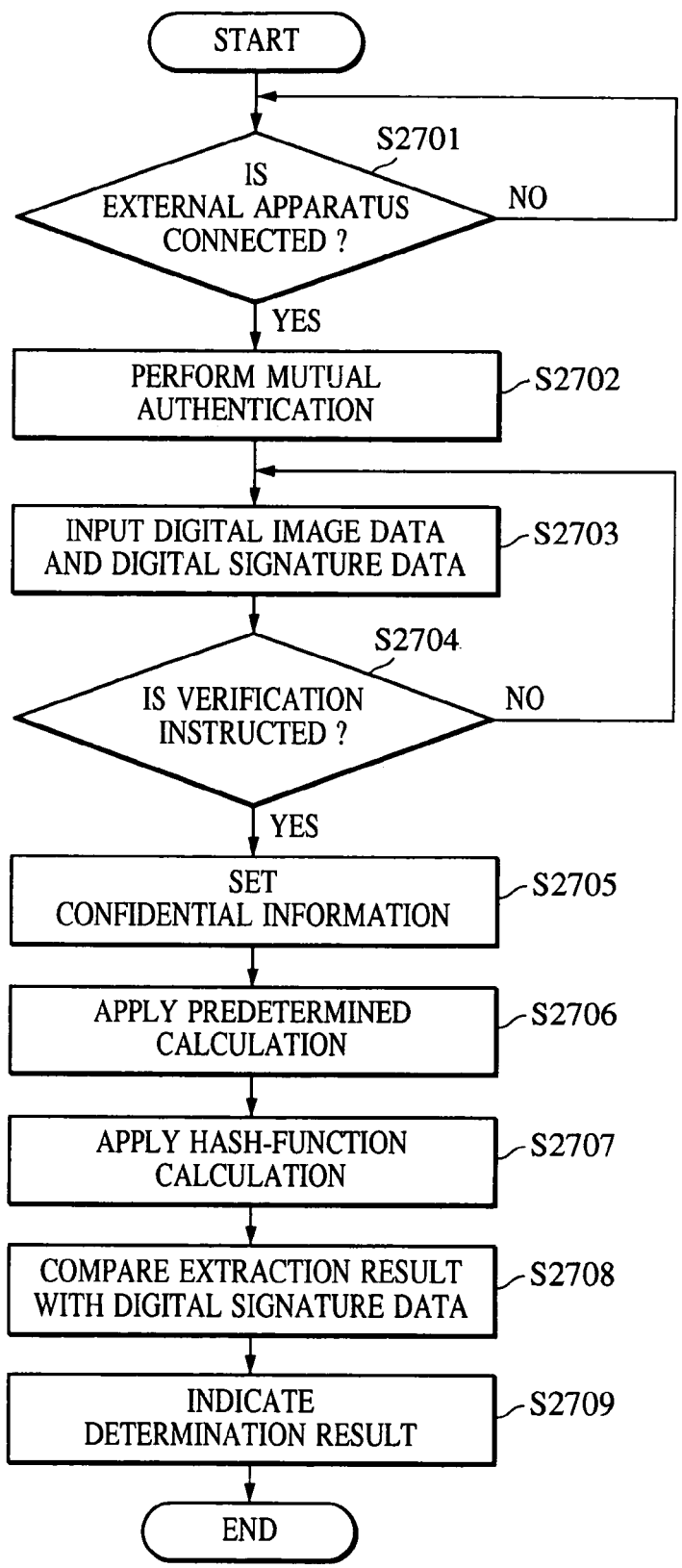
FIG. 28 is a flowchart of processing procedures according to eleventh and twelfth embodiments.

FIG. 28 is a flowchart showing a processing procedure in the eleventh embodiment. A procedure for verifying digital image data P in the image verification apparatus 20 will be described below by referring to FIG. 28.

In a step S2701, the control/calculation section 303 of the image verification apparatus 20 determines whether an external apparatus 40 is connected to the external interface section 301.

In a step S2702, the image verification apparatus 20 and the external apparatus 40 perform mutual authentication to check if they are legitimate to each other.

Since processes in steps S2703 and S2704 are the same as those in the steps S2301 and S2302 in the seventh embodiment, a description thereof will be omitted.

In a step S2705, the control/calculation section 303 stores confidential information S unique to the external apparatus 40 and input through the external interface section 301, to the memory 313 and manages it.

In a step S2706, the control/calculation section 303 (actually, the calculation circuit 312 included therein) performs a predetermined calculation based on a rule determined in advance, by the use of the confidential information S and JPEG data. The calculation circuit 312 executes the same calculation as that in the step S2304 in the seventh embodiment.

In a step S2707, the control/calculation section 303 (actually, the calculation circuit 312 included therein) applies a hash-function calculation to the calculation result obtained in the step S2706. The calculation circuit 312 executes the same calculation as that in the step S2305 in the seventh embodiment.

In a step S2708, the control/calculation section 303 (actually, the calculation circuit 312 included therein) compares the result of the calculation performed in the step S2707 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2709, the display section 304 shows an image or a message indicating the comparison result. With this operation, it is visually easy for the user to recognize the integrity of the selected JPEG data.

A program for controlling the processing procedure shown in FIG. 28 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the eleventh embodiment, the integrity of the digital image data P which was captured and highly efficiently encoded by the image input apparatus 10 according to the fifth embodiment is recognized with a simpler structure than in the conventional system. In addition, a more inexpensive structure than in the conventional system can be implemented, and higher-speed processing can be achieved. Furthermore, with the use of digital signature data h, an external apparatus which has captured digital image data or a user who has instructed to capture digital image data can be identified.

Twelfth Embodiment

In a twelfth embodiment, an image verification apparatus 20 for checking the integrity of digital image data P with the use of the digital signature data h generated by the image input apparatus 10 according to the sixth embodiment will be described.

A processing procedure in the twelfth embodiment will be described below by referring to FIG. 28.

Since processes in steps S2701 to S2704 are the same as those in the eleventh embodiment, a description thereof will be omitted.

In a step S2705, the control/calculation section 303 reads confidential information S1 unique to the image input apparatus 10 from the memory 313 and receives confidential information S2 unique to an external apparatus 40 through the external interface 301. Then, these confidential information items S1 and S2 are combined to form new confidential information S in the same way as in the sixth embodiment.

In a step S2706, the control/calculation section 303 (actually, the calculation circuit 312 included therein) performs a predetermined calculation based on a rule determined in advance, by the use of the confidential information S and JPEG data. The calculation circuit 312 executes the same calculation as that in the step S2304 in the seventh embodiment.

In a step S2707, the control/calculation section 303 (actually, the calculation circuit 312 included therein) applies a hash-function calculation to the calculation result obtained in the step S2706. The calculation circuit 312 executes the same calculation as that in the step S2305 in the seventh embodiment.

In a step S2708, the control/calculation section 303 (actually, the calculation circuit 312 included therein) compares the result of the calculation performed in the step S2707 with the digital signature data h of the selected JPEG data. When they match in the comparison, it is determined that the JPEG data is legitimate. If they do not match, it is determined that illegitimate processing (such as modification, falsification, forgery, or synthesis) has been applied to the JPEG data.

In a step S2709, the display section 304 shows an image or a message indicating the comparison result. With this operation, it is visually easy for the user to recognize the integrity of the selected JPEG data.

A program for controlling the processing procedure shown in FIG. 28 is stored in the ROM 305. The program is read by the control/calculation section 303 (actually, the control circuit 312 included therein) and is activated every time the verification of a desired image is instructed.

According to the above procedure, if the integrity of the selected JPEG data is not verified, the control circuit 310 controls each processing circuit so as to discard the JPEG data.

As described above, in the twelfth embodiment, the integrity of the digital image data P which was captured and highly efficiently encoded by the image input apparatus 10 according to the sixth embodiment is recognized with a simpler structure than in the conventional system. In addition, a more inexpensive structure than in the conventional system can be implemented, and higher-speed processing can be achieved. Furthermore, it can be determined with the use of digital signature data h which image input apparatus connected to which external apparatus has captured digital image data or which image input apparatus used by which user has captured digital image data.

The present invention may be embodied in other specific forms without departing from the spirit or essential characteristics thereof.

In the first to sixth embodiments, the image input apparatus 10 generates digital signature data. An external apparatus 40 connected to the image input apparatus 10 may generate digital signature data. In this case, after the apparatuses authenticate each other, a processing program required for generating digital signature data, and highly efficiently encoded digital image data are sent from the image input apparatus 10 to the external apparatus 40, and digital signature data is generated.

In the first to sixth embodiments, it is also possible that calculation processing required for generating digital signature data is separated and performed by the image input apparatus 10 and the external apparatus 40, and both apparatuses cooperatively generate digital signature data. In this case, after the apparatuses authenticate each other, only required portions of a processing program required for generating digital signature data, and highly efficiently encoded digital image data are sent from the image input apparatus 10 to the external apparatus 40, and digital signature data is generated.

In the seventh to twelfth embodiments, the image verification apparatus 20 generates digital signature data with the use of externally input digital image data. An external apparatus 40 connected to the image verification apparatus 20 may generate digital signature data. In this case, after the apparatuses authenticate each other, a processing program required for generating digital signature data, and externally input digital image data are sent from the image verification apparatus 20 to the external apparatus 40, and digital signature data is generated.

In the seventh to twelfth embodiments, it is also possible that calculation processing required for generating digital signature data is separated and performed by the image verification apparatus 20 and the external apparatus 40, and both apparatuses cooperatively generate digital signature data. In this case, after the apparatuses authenticate each other, only required portions of a processing program required for generating digital signature data, and externally input digital image data are sent from the image verification apparatus 20 to the external apparatus 40, and digital signature data is generated.

In the seventh to twelfth embodiments, the programs for controlling the processing procedures shown in FIGS. 24 to 28 are activated every time the verification of a desired image is instructed. The programs may be automatically activated when a desired image is externally input.

The above-mentioned embodiments are merely examples in all respects and must not be construed to limit the present invention.

The scope of the present invention is defined by the scope of appended claims, and is not limited at all by the specific descriptions of this specification. Furthermore, all modifications and changes belonging to the equivalents of the claims are considered to fall within the scope of the present invention.

What is claimed is:

1. An apparatus for generating additional data used to check whether an encoded digital image is changed or not, the apparatus comprising:
    a calculation unit which (a) performs a predetermined calculation using the encoded digital image and confidential information, and (b) generates the additional data by applying a one-way function to a result of the predetermined calculation; and
    a recording unit which records both the encoded digital image and the additional data on a recording medium,
    wherein the confidential information includes (a) first information unique to the apparatus, and (b) second information unique to an external apparatus connected to the apparatus.

2. An apparatus for checking whether an encoded digital image is changed or not, the apparatus comprising:
    an inputting unit which inputs both the encoded digital image and first additional data, the first additional data being used to check whether the encoded digital image is changed or not; and
    a calculation unit which (a) performs a predetermined calculation using the encoded digital image and confidential information, (b) generates second additional data by applying a one-way function to a result of the predetermined calculation, and (c) checks whether the encoded digital image is changed or not using the first additional data and the second additional data,
    wherein the confidential information includes (a) first information unique to a first apparatus which generates the first additional data, and (b) second information unique to a second apparatus connected to the first apparatus.

3. A method of generating additional data used to check whether an encoded digital image is changed or not, the method comprising the steps of:
    performing a predetermined calculation using the encoded digital image and confidential information;
    generating the additional data by applying a one-way function to a result of the predetermined calculation; and
    recording both the encoded digital image and the additional data on a recording medium,
    wherein the confidential information includes (a) first information unique to a first apparatus which performs the predetermined calculation and (b) second information unique to a second apparatus connected to the first apparatus.

4. A method of checking whether an encoded digital image is changed or not, the method comprising the steps of:
    inputting both the encoded digital image and first additional data, the first additional data being used to check whether the encoded digital image is changed or not;
    performing a predetermined calculation using the encoded digital image and confidential information;
    generating second additional data by applying a one-way function to a result of the predetermined calculation; and
    checking whether the encoded digital image is changed or not using the first additional data and the second additional data,
    wherein the confidential information includes (a) first information unique to a first apparatus which generates the first additional data, and (b) second information unique to a second apparatus connected to the first apparatus.

5. An apparatus according to claim 1, wherein the additional data is also used for checking integrity of the encoded digital image.

6. An apparatus according to claim 1, wherein the confidential information is information unique to the apparatus.

7. An apparatus according to claim 1, wherein the confidential information is information unique to an external apparatus connected to the apparatus.

8. An apparatus according to claim 1, wherein the confidential information includes first information unique to the apparatus, and second information unique to an external apparatus connected to the apparatus.

9. An apparatus according to claim 1, wherein the apparatus is an apparatus which operates as a digital camera.

10. An apparatus according to claim 1, wherein the apparatus is an apparatus which operates as a scanner.

11. An apparatus according to claim 1, wherein the predetermined calculation includes an exclusive-OR operation.

12. An apparatus according to claim 2, wherein the first and second additional data is also used to check integrity of the encoded digital image.

13. An apparatus according to claim 2, wherein the confidential information is information unique to an apparatus which generates the first additional information.

14. An apparatus according to claim 2, wherein the confidential information is information unique to an external apparatus connected to an apparatus which generates the first additional information.

15. An apparatus according to claim 2, wherein the confidential information includes first information unique to an apparatus which generates the first additional information, and second information unique to an external apparatus connected to that apparatus.

16. An apparatus according to claim 2, wherein the encoded digital image and the first additional data are generated in the first apparatus, and the first apparatus is an apparatus which operates as a digital camera.

17. An apparatus according to claim 2, wherein the encoded digital image and the first additional data are generated in the first apparatus, and the first apparatus is an apparatus which operates as a scanner.

18. An apparatus according to claim 2, wherein the predetermined calculation includes an exclusive-OR operation.

19. A method according to claim 3, wherein the additional data is also used to check integrity of the encoded digital image.

20. A method according to claim 3, wherein the confidential information is information unique to an apparatus using the method.

21. A method according to claim 3, wherein the confidential information is information unique to an external apparatus connected to an apparatus using the method.

22. A method according to claim 3, wherein the confidential information includes first information unique to an apparatus using the method, and second information unique to an external apparatus connected to that apparatus.

23. A method according to claim 3, wherein the method can operate in a digital camera.

24. A method according to claim 3, wherein the method can operate in a scanner.

25. A method according to claim 3, wherein the predetermined calculation includes an exclusive-OR operation.

26. A method according to claim 4, wherein the first and second additional data is also used for checking integrity of the encoded digital image.

27. A method according to claim 4, wherein the confidential information is information unique to an apparatus which generates the first additional information.

28. A method according to claim 4, wherein the confidential information is information unique to an external apparatus connected to an apparatus which generates the first additional information.

29. A method according to claim 4, wherein the confidential information includes first information unique to an apparatus which generates the first additional information, and second information unique to an external apparatus connected to that apparatus.

30. A method according to claim 4, wherein the encoded digital image and the first additional data are generated in the first apparatus, and the first apparatus is an apparatus which operates as a digital camera.

31. A method according to claim 4, wherein the encoded digital image and the first additional data are generated in the first apparatus and the first apparatus is an apparatus which operates as a scanner.

32. A method according to claim 4, wherein the predetermined calculation includes an exclusive-OR operation.

* * * * *

UNITED STATES PATENT AND TRADEMARK OFFICE
CERTIFICATE OF CORRECTION

| | |
|---|---|
| PATENT NO. | : 7,296,161 B1 |
| APPLICATION NO. | : 09/521424 |
| DATED | : November 13, 2007 |
| INVENTOR(S) | : Wakao et al. |

It is certified that error appears in the above-identified patent and that said Letters Patent is hereby corrected as shown below:

In the drawings

| | |
|---|---|
| Sheet 3, Fig. 3, | "IMGAE" should read --IMAGE--. |
| Sheet 19, Fig. 20, | "S1203" should read --S1903--. |
| Col. 1, line 14, | "in" should read --on--. |
| Col. 2, line 16, | "invention to" should read --invention is to--. |
| Col. 3, line 33, | "more" should be deleted. |
| Col. 10, line 2, | "steps the" should read --the steps--. |
| Col. 11, line 27, | "exclusive Ored" should read --exclusive-ORed--. |
| Col. 13, line 8, | "function" should read --function,--. |
| Col. 15, line 34, | "function" should read --function,--. |
| Col. 18, line 23, | "information S" should read --information S,--. |
| line 37, | "cannot generated" should read --cannot be generated--. |
| Col. 20, line 48, | "medium" should read --medium,--. |
| Col. 27, line 65, | "calculation" should read --calculation,--. |
| Col. 28, line 39, | "is" should read --are--. |
| Col. 29, line 18, | "is" should read --are--. |

UNITED STATES PATENT AND TRADEMARK OFFICE
CERTIFICATE OF CORRECTION

PATENT NO.         : 7,296,161 B1
APPLICATION NO.    : 09/521424
DATED              : November 13, 2007
INVENTOR(S)        : Wakao et al.

It is certified that error appears in the above-identified patent and that said Letters Patent is hereby corrected as shown below:

Col. 28, line 20,    "checking integrity" should read --checking the integrity--.

line 66,    "checking integrity" should read --checking the integrity--.

Signed and Sealed this

First Day of July, 2008

JON W. DUDAS
*Director of the United States Patent and Trademark Office*